US012659834B2

(12) United States Patent
Zhang et al.

(10) Patent No.: US 12,659,834 B2
(45) Date of Patent: Jun. 16, 2026

(54) BGP SIGNALING FOR ACCESS NETWORK-USER PLANE FUNCTION

(71) Applicant: Juniper Networks, Inc., Sunnyvale, CA (US)

(72) Inventors: Zhaohui Zhang, Westford, MA (US); Arda Akman, San Ramon, CA (US); Constantine Dimitrios Polychronopoulos, Saratoga, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 372 days.

(21) Appl. No.: 18/343,248

(22) Filed: Jun. 28, 2023

(65) Prior Publication Data

US 2024/0224158 A1 Jul. 4, 2024

Related U.S. Application Data

(60) Provisional application No. 63/478,075, filed on Dec. 30, 2022.

(51) Int. Cl.
| | |
|---|---|
| *H04W 40/28* | (2009.01) |
| *H04L 45/00* | (2022.01) |
| *H04L 45/74* | (2022.01) |

(52) U.S. Cl.
CPC ........... *H04W 40/28* (2013.01); *H04L 45/566* (2013.01); *H04L 45/74* (2013.01)

(58) Field of Classification Search
None
See application file for complete search history.

(56) References Cited

U.S. PATENT DOCUMENTS

| | | |
|---|---|---|
| 10,798,617 B1 | 10/2020 | Ghadge et al. |
| 11,303,696 B2 | 4/2022 | You et al. |

(Continued)

FOREIGN PATENT DOCUMENTS

| | | |
|---|---|---|
| CN | 110198307 A | 9/2019 |
| WO | 2019078888 A1 | 4/2019 |

(Continued)

OTHER PUBLICATIONS

Extended Search Report from counterpart European Application No. 23200670.0 dated Feb. 16, 2024, 10 pp.

(Continued)

*Primary Examiner* — Eunsook Choi
(74) *Attorney, Agent, or Firm* — Shumaker & Sieffert P. A.

(57) ABSTRACT

In general, techniques are described for extending Mobile User Plane-Gateway architecture Border Gateway Protocol (BGP) signaling to an integrated Access Network-User Plane (ANUP) function in mobile networks. In an example, a method comprises receiving, by a computing system, a routing protocol message comprising second tunnel information for a packet data unit (PDU) session for a User Equipment (UE) and comprising data indicating a routing instance or a UE address for the User Equipment; by the computing system, based on matching the second tunnel information with first tunnel information sent or received on an interface with a mobile network control plane function, generating forwarding information to map the UE address to the PDU session or to map the PDU session to the routing instance; and based on the forwarding information, outputting, by the computing system, a packet associated with the PDU session.

19 Claims, 17 Drawing Sheets

(56)                References Cited

U.S. PATENT DOCUMENTS

| | | | |
|---|---|---|---|
| 11,375,527 B1 | 6/2022 | Eyuboglu et al. | |
| 11,418,600 B1 | 8/2022 | Panem Jaya et al. | |
| 11,871,291 B2 * | 1/2024 | Shan | H04W 76/12 |
| 11,979,349 B2 | 5/2024 | Zhang et al. | |
| 2017/0012816 A1 | 1/2017 | Park et al. | |
| 2019/0053117 A1 | 2/2019 | Bae et al. | |
| 2020/0007590 A1 * | 1/2020 | Dodd-Noble | H04L 65/1069 |
| 2020/0107213 A1 | 4/2020 | Park et al. | |
| 2020/0287826 A1 | 9/2020 | Wang | |
| 2020/0367201 A1 | 11/2020 | Cai et al. | |
| 2020/0383009 A1 * | 12/2020 | Qiao | H04W 36/12 |
| 2021/0367703 A1 | 11/2021 | Chandramouli et al. | |
| 2022/0038960 A1 * | 2/2022 | Xu | H04W 36/0011 |
| 2022/0338084 A1 * | 10/2022 | Ryu | H04W 36/14 |
| 2022/0345984 A1 * | 10/2022 | Patel | H04L 69/22 |
| 2023/0042390 A1 * | 2/2023 | Mildh | H04W 48/17 |
| 2023/0102552 A1 | 3/2023 | Ali et al. | |
| 2023/0155762 A1 * | 5/2023 | Zhang | H04W 76/12 370/433 |
| 2024/0348534 A1 * | 10/2024 | Kim | H04W 76/15 |

FOREIGN PATENT DOCUMENTS

| | | | |
|---|---|---|---|
| WO | 2020106274 A1 | 5/2020 | |
| WO | 2020173137 A1 | 9/2020 | |
| WO | 2020197451 A1 | 10/2020 | |

OTHER PUBLICATIONS

"3rd Generation Partnership Project," Technical Specification Group Services and System Aspects; System architecture for the 5G System (5GS); Stage 2 (Release 17), 3GPP Ts 23.501 V17.7.0, Dec. 2022, 573 pp.

Bryant et al., "Pseudo Wire Emulation Edge-to-Edge (PWE3) Architecture," Network Working Group, RFC 3985, Mar. 2005, 42 pp.

Jaffry et al., "PDU Session Establishment in 5G," medium.com, Jan. 12, 2023, 3 pp.

Matsushima et al., Segment Routing IPv6 Mobile User Plane Architecture for Distributed Mobility Management draft-mhkk-dmm-srv6mup-architecture-01, Internet Engineering Task Force, Internet-Draft, Nov. 10, 2021, 34 pp.

Matsushima et al., "Segment Routing IPV6 Mobile User Plane Architecture for Distributed Mobility Management draft-mhkk-dmm-srv6mup-architecture-04," Internet Engineering Task Force, Internet-Draft, Oct. 24, 2022, 41 pp.

Matsushima et al., "Segment Routing IPv6 Mobile User Plane Architecture for Distributed Mobility Management," draft-mhkk-dmm-srv6mup-architecture-02, Internet Engineering Task Force, Mar. 7, 2022, 17 pp.

Murakami et al., "BGP Extensions for the Mobile User Plane (MUP) SAFI draft-mpmz-bess-mup-safi-00.txt," Internet-Draft, Mar. 7, 2022, 39 pp.

Murakami et al., "BGP Extensions for the Mobile User Plane (MUP) SAFI," Internet-Draft: draft-mpmz-bess-mup-safi-02, Mar. 13, 2023, 18 pp.

Rosen et al., "BGP/MPLS IP Virtual Private Networks (VPNs)," Network Working Group, RFC 4364, Feb. 2006, 47 pp.

Sangli et al., "BGP Extended Communities Attribute," Network Working Group, RFC 4360, Feb. 2006, 12 pp.

Xiao et al., "Requirements for Pseudo-Wire Emulation Edge-to-Edge (PWE3)," Network Working Group, RFC 3916, Sep. 2004, 19 pp.

Zhang et al., "BGP Signaling for Mobile User Plane," draft-zpm-dmm-mup-bgp-signaling-00, Internet-Draft, Mar. 7, 2022, 8 pp.

Zhang et al., "Mobile User Plane Evolution draft-zzhang-dmm-mup-evolution-02," Internet-Draft, Oct. 24, 2022, 19 pp.

Zhang, "5G Edge Cloud and Multi-access Edge Computing (MEC) Security," Juniper Networks, Retrieved from: https://blogs.juniper.net/en-us/service-provider-transformation/5g-edge-cloud-and-multi-access-edge-computing-mec-security, Dec. 17, 2020, 5 pp.

Response to Extended Search Report dated Feb. 16, 2024, from counterpart European Application No. 23200670.0 filed Dec. 20, 2024, 20 pp.

"5G System Enhancements for Edge Computing; Stage 2", (3GPP TS 23.548 V17.0.0 Release 17), 3GPP A Global Initiative, Sep. 24, 2021, 52 pp.

* cited by examiner

1602

| Session Translated Route Type 1 (ST1) | | PDU Session |
|---|---|---|
| UE Prefix | Access network address | Access Network TEID | (Next Hop) |
| | | | |
| | | | |

No GTP Encapsulation or Decapsulation

1604

| PDU Session | Session Translated Route Type 2 (ST2) | |
|---|---|---|
| | UPF Address | UPF TEID | N6VRF |
| | | | |
| | | | |

No GTP Encapsulation or Decapsulation

FIG. 12

DOWNLINK

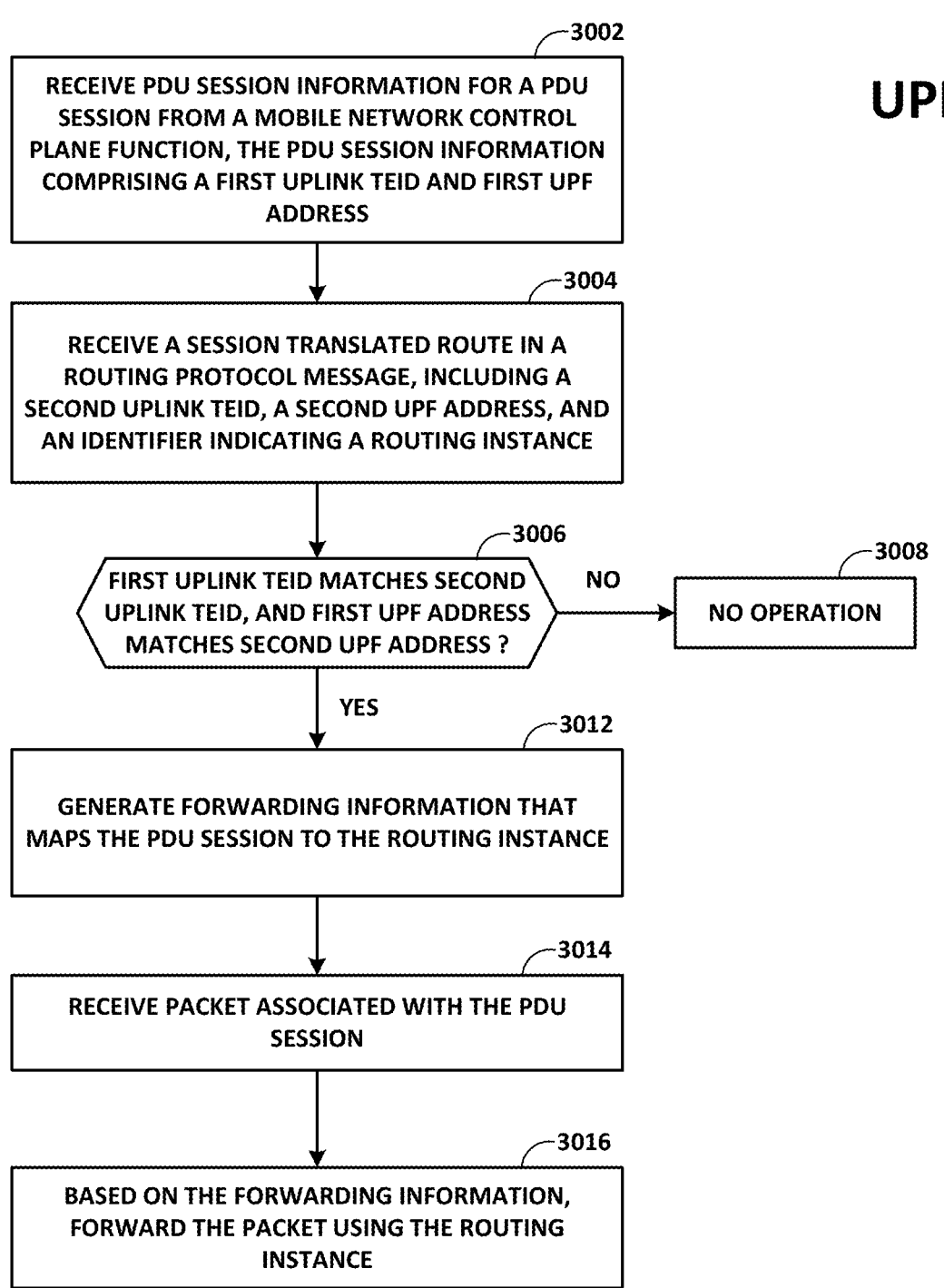

UPLINK

3002

RECEIVE PDU SESSION INFORMATION FOR A PDU SESSION FROM A MOBILE NETWORK CONTROL PLANE FUNCTION, THE PDU SESSION INFORMATION COMPRISING A FIRST UPLINK TEID AND FIRST UPF ADDRESS

3004

RECEIVE A SESSION TRANSLATED ROUTE IN A ROUTING PROTOCOL MESSAGE, INCLUDING A SECOND UPLINK TEID, A SECOND UPF ADDRESS, AND AN IDENTIFIER INDICATING A ROUTING INSTANCE

3006

FIRST UPLINK TEID MATCHES SECOND UPLINK TEID, AND FIRST UPF ADDRESS MATCHES SECOND UPF ADDRESS ?

NO

3008

NO OPERATION

YES

3012

GENERATE FORWARDING INFORMATION THAT MAPS THE PDU SESSION TO THE ROUTING INSTANCE

3014

RECEIVE PACKET ASSOCIATED WITH THE PDU SESSION

3016

BASED ON THE FORWARDING INFORMATION, FORWARD THE PACKET USING THE ROUTING INSTANCE

FIG. 15

BGP SIGNALING FOR ACCESS NETWORK-USER PLANE FUNCTION

This application claims the benefit of U.S. Provisional Application No. 63/478,075, filed 30 Dec. 2022, which is incorporated by reference herein in its entirety.

TECHNICAL FIELD

The disclosure relates to computer networking and, more specifically, to mobile networks that connect to data networks.

BACKGROUND

Computer networks have become ubiquitous, and the number of network applications, network-connected devices, and types of network-connected devices are rapidly expanding. Such devices now include computers, smart phones, Internet-of-Things (IOT) devices, cars, medical devices factory equipment, etc. An end-user network-connected device typically cannot directly access a public network such as the Internet. Instead, an end-user network device establishes a network connection with an access network, and the access network communicates with a core network that is connected to one or more data networks (DNs) offering services.

Mobile networks include one or more Radio Access Networks (RANs) that are access networks for 3rd Generation Partnership Project (3GPP) networks, trusted and untrusted non-3GPP networks such as Wi-Fi or WiMAX networks, and fixed/wireline networks such as Digital Subscriber Line (DSL), Passive Optical Network (PON), and cable networks. The mobile core network may be that of a mobile service provider network, such as a 3G, 4G/LTE, 5G network.

Mobile User Plane (MUP) is proposed mobile networking signaling framework for 5G and subsequent generations of 3GPP that converts N4 signaling from the Session Management Function (SMF) to Border Gateway Protocol messages.

The 5G User Plane uses N4 signaling between the SMF and User Plane Function (UPF), and N2 signaling between Access & Mobility Management Function (AMF) and the access network (AN) (e.g., gNodeBs of the AN). A centralized UPF device may be deployed and GTP tunnels transport UE data traffic between the UPF device and the AN. N4 and N2 signaling sets up the GTP tunnels, with forwarding on the UPF based in part on GTP Tunnel Endpoint IDentifiers (TEIDs). Distributed UPFs can also be deployed while providing persistent IP addresses for UEs. The 5G User Plane is described in 3$^{rd}$ Generation Partnership Project, *Technical Specification Group Services and System Aspects; System architecture for the 5G System (5GS); Stage 2 (Release 17)*, 3GPP TS 23.501 V17.7.0 (2022-12), the entire contents of which is hereby incorporated by reference.

Proposals describe deploying UPFs that operate more similar to a router, using BGP instead of N4 signaling with an SMF. GTP tunneling can still be used or it can be partially replaced by another form of tunneling, such as SRv6/MPLS tunneling. Such proposals do not require any change to the 3GPP architecture, signaling and deployment model, but a controller (sometimes referred to as "MUP controller" or "N4BGP controller") is used to convert N4 signaling to BGP. The proposals are described in "Segment Routing IPV6 Mobile User Plane Architecture for Distributed Mobility Management," draft-mhkk-dmm-srv6mup-architecture- 02, Internet Engineering Task Force, 7 Mar. 2022; and in "BGP Extensions for the Mobile User Plane (MUP) SAFI," draft-mpmz-bess-mup-safi-00, Internet Engineering Task Force, 7 Mar. 2022; each of which is incorporated herein by reference in its entirety.

Although these two IETF draft proposals are specific to Segment Routing, in particular SRv6, the proposals can be extended to work using VPN services, as described in "BGP Signaling for Mobile User Plane," draft-zpm-dmm-mup-bgp-signaling-00, Internet Engineering Task Force, 7 Mar. 2022, which is incorporated herein by reference in its entirety. This proposal describes BGP signaling for router-based 5G User Plane using Mobile User Plane Subsequent Address Family Indicator (SAFI) and route types for the Mobile User Plane SAFI as specified in "BGP Extensions for the Mobile User Plane (MUP) SAFI."

SUMMARY

In general, techniques are described for extending Mobile User Plane-Gateway architecture Border Gateway Protocol (BGP) signaling to an integrated Access Network-User Plane (ANUP) function in mobile networks. An ANUP function co-locates an access network node, such as a gNodeB Centralized Unit (CU), with a UPF to eliminate General Packet Radio Service (GPRS) Tunneling Protocol (GTP) tunneling from the N3 interface of a 5G User Plane. The ANUP function continues to implement the N2 interface with the Access Mobility Management Function (AMF). The ANUP function is extended to receive routes ("session translated routes") having route types for the Mobile User Plane (MUP) Subsequent Address Family Indicator (SAFI), where the session translated routes are translated from session information by a controller communicating with the Session Management Function on the N4 interface of the 5G User Plane.

The ANUP function described herein correlates N2- (from the AMF) and BGP- (from the controller) signaled data to eliminate, at least for some sessions, GTP encapsulation and decapsulation. For example, after correlating tunnel information from N2-signaled data and tunnel information from BGP-signaled data, the ANUP function may map a UE address included in a first type of the session translated routes to a PDU session/data radio bearer for downlink traffic (toward the UE). As another example, after correlating tunnel information from N2-signaled data and tunnel information from BGP-signaled data, the ANUP function may map a PDU session to a routing instance that is included in a second type of the session translated routes for uplink traffic. This routing instance may be located on the ANUP function, for example. In some examples, the routing instance can be identified based on an Extended Community derived from (and mapping to) the Route Target for a VPN ("N6VPN") used for implementing the transport network for the N6 interface. In some examples, the techniques include advertising BGP Flow Spec routes to cause the ANUP function to mirror matching traffic for Lawful Intercept (LI) purposes.

The techniques may provide one or more technical advantages to the computer-related field of mobile network communications that are integrated into one or more practical applications. For example, by extending BGP signaling with MUP SAFI to the ANUP, the techniques effectively extend BGP signaling to the access network nodes for the radio access network of the mobile network. The techniques can therefore eliminate GTP tunneling, and thus GTP encapsulation/decapsulation, for UE traffic being transported between a data network and UEs. Reducing GTP encapsulation/decapsulation reduces compute resource consumption, decreases packet processing latency, and facilitate reduced packet overhead. In addition, because the techniques involve the ANUP processing session translated routes generated by the controller signaling with the SMF on the N4 interface, there is no modification needed or difference in the deployment mode for the SMF and access network node. That is, from the point of view of the SMF, the SMF is communicating with a UPF on the control plane/N4 interface. From the point of view of the access network nodes (e.g., gNodeB), the access network nodes are communicating with a UPF on the data plane/N3 interface (though without GTP). The techniques also reduce a possibility of vendor lock-in on the UPF implementation by leveraging BGP and VPNs for transport using the MUP SAFI. The UPF(s) data forwarding function is, in effect, replaced by a VPN connecting data networks to the access network, and session routing information is injected into this VPN by the controller, while the ANUP maps VPN routing information to PDU sessions in the downlink and uplink directions.

In an example, a computing system comprises one or more storage devices; and processing circuitry having access to the one or more storage devices, the processing circuitry configured to: receive a routing protocol message comprising second tunnel information for a packet data unit (PDU) session for a User Equipment (UE) and comprising data indicating a routing instance or a UE address for the User Equipment; based at least in part on matching the second tunnel information with first tunnel information sent or received on an interface with a mobile network control plane function, generate forwarding information to map the UE address to the PDU session or to map the PDU session to the routing instance; and based at least in part on the forwarding information, output a packet associated with the PDU session.

In an example, a method comprises receiving, by a computing system, a routing protocol message comprising second tunnel information for a packet data unit (PDU) session for a User Equipment (UE) and comprising data indicating a routing instance or a UE address for the User Equipment; by the computing system, based at least in part on matching the second tunnel information with first tunnel information sent or received on an interface with a mobile network control plane function, generating forwarding information to map the UE address to the PDU session or to map the PDU session to the routing instance; and based at least in part on the forwarding information, outputting, by the computing system, a packet.

In an examples, one or more computer-readable storage devices comprise instructions for causing processing circuitry to: receive a routing protocol message comprising second tunnel information for a packet data unit (PDU) session for a User Equipment (UE) and comprising data indicating a routing instance or a UE address for the User Equipment; based at least in part on matching the second tunnel information with first tunnel information sent or received on an interface with a mobile network control plane function, generate forwarding information to map the UE address to the PDU session or to map the PDU session to the routing instance; and based at least in part on the forwarding information, output a packet associated with the PDU session The details of one or more examples are set forth in the accompanying drawings and the description below. Other features, objects, and advantages will be apparent from the description and drawings, and from the claims.

BRIEF DESCRIPTION OF DRAWINGS

FIG. 12 is a block diagram illustrating mappings of session translated route information and PDU sessions for an ANUP, in accordance with techniques of this disclosure.

FIG. 15 is a flowchart depicting an example mode of operation for ANUP to determine forwarding for uplink traffic for a PDU session.

Like reference characters denote like elements throughout the text and figures.

DETAILED DESCRIPTION

Figure 1A:
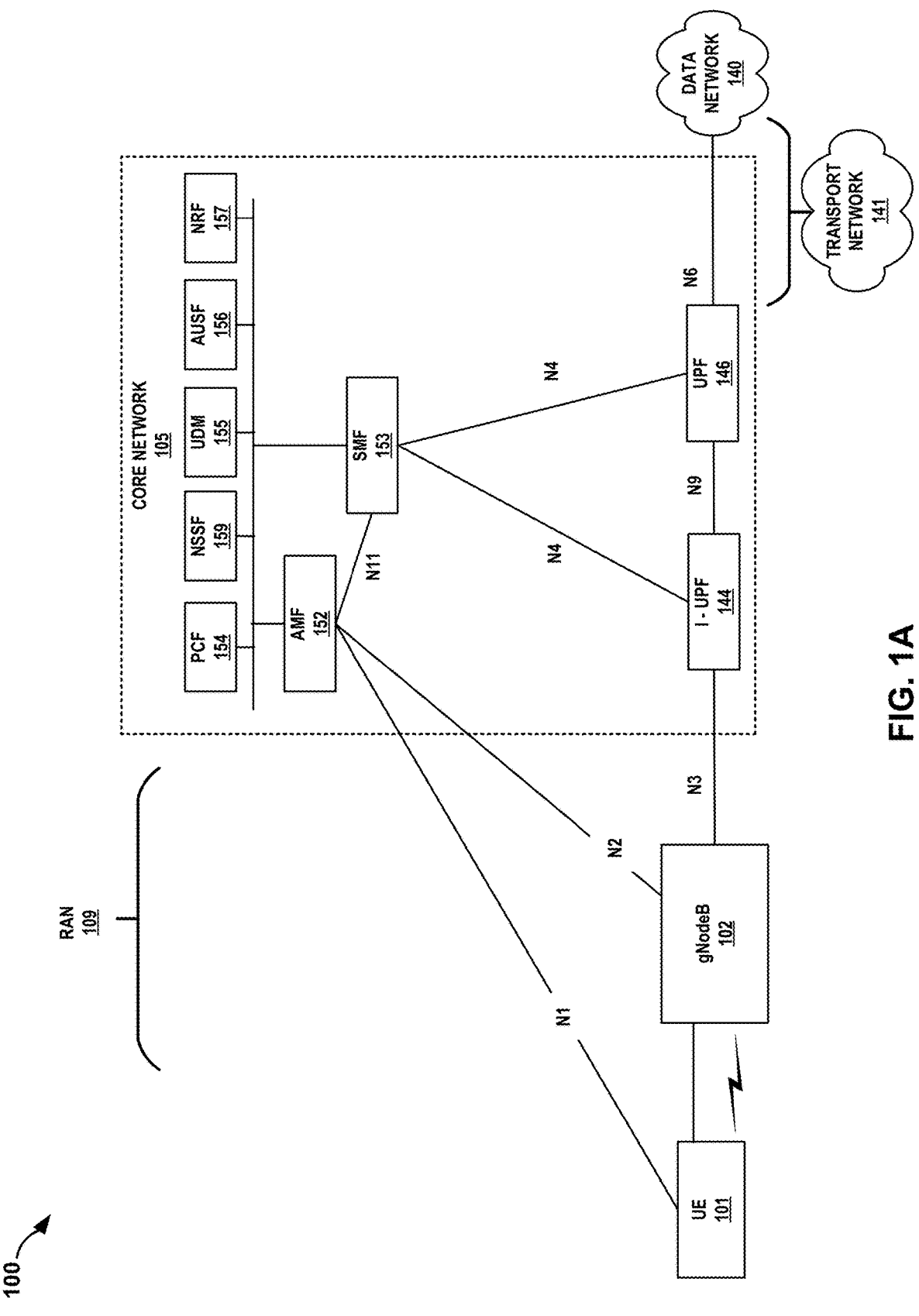
FIG. 1A is a block diagram illustrating an example 5G mobile network system.

In the 3GPP 5G specifications, the user plane includes a tunnel for a N3 interface which transports user data traffic between the RAN (Radio Access Network) and the User Plane Function (UPF) in the mobile core network, and the UPF acts as a session anchor for a PDU (protocol data unit) session. Further, a UPF may connect to one or more other UPFs serially via a N9 interface. Because the 3GPP 5G specifications specify that all N3 and N9 tunnelling use GTP [GPRS (general packet radio service) Tunneling Protocol], which involves an additional encapsulation of the underlying data, elimination of the N3 tunneling can be advantageous.

In 5G mobile network systems, the N3 tunneling may be in part over an IP-VPN in the transport infrastructure, which is typically multi-service for both fixed and mobile networks. UPFs are commonly deployed at centralized locations in the core network, and as mentioned the N3/N9 tunnels extend the PDU layer to and among the UPFs. A UPF terminates PDU sessions to/from data networks (DNs), where each PDU session can by transported using a VPN over the transport infrastructure. A centralized UPF maintains per-session state [in terms of PDRs (Packet Detection Rules) and FARs (Forwarding Action Rules)] for many thousands of UEs and is typically a large system that serves many hundreds or thousands of access network nodes (e.g., gNodeBs or other base stations). For 5G, the gNodeB of the RAN connects the N3 GTP tunnel to radio bearers.

In some implementations of a 5G mobile network user plane, rather than being centralized, UPFs are distributed closer to the RAN and the mobile core network edge in such a manner that they can be co-located (i.e., in the same data center or even server) with the gNodeB of the RAN, to facilitate multi-access edge processing. In co-location examples, the N3 interface may be simplified to become a direct and/or internal connection between the gNodeB and the UPF. Because the UPF to DN connection is direct, the connection link becomes a VPN (e.g., IP VPN in the case of IP PDU session) over a transport infrastructure, most likely the same transport infrastructure for the VPN supporting the N3/N9 tunneling.

In some examples of a mobile network user plane described herein, the user plane function and at least some aspects of the gNodeB/RAN functions are consolidated into a single network function that can be deployed to support base stations. This consolidated network function is referred to herein as Access Network (and/plus) User Plane function (hereinafter, simply "ANUP" for the function or a device that implements an ANUP function) to reflect that it is a combination of the access network gNodeB functions (AN functions) and the User Plane Function. Such a consolidated single network function can be implemented in future generations ("xG") of 3GPP mobile networks, wherein N3 tunneling between an access network function and a UPF is not required by 3GPP standards.

The use of an ANUP function with Mobile User Plane-Gateway architecture can provide a technical advantage over previous systems. For example, the techniques may simplify, and in some cases eliminate entirely, the N3 interface and its corresponding requirements for encapsulation, replacing it with IP-VPNs and bringing IETF (Internet Engineering Task Force) standards into the "mobile core network" where packetized transport is used, while retaining 3GPP standards for the radio links of the RAN. Various tunneling technologies compatible with VPNs may be used, including but not limited to segment routing (e.g., SRv6), and tunnels can be per-VRF (virtual routing and forwarding) or per-session. In effect, virtual private network technology achieves what was previously accomplished using the N3 tunnels (and N9 tunnels in some deployments). This contrasts with proposals by others to extend the N3 tunnels to the DNs. Additional advantages are described elsewhere in this document.

In keeping with the incorporation of IP-VPNs, host routes advertised by the ANUPs to the DNs may replace per-session PDR/FAR rules and in some cases eliminate General Packet Radio Service (GPRS) Tunneling Protocol (GTP) in the mobile network protocol stack. However, the traffic pattern may remain similar to a more centralized UPF deployment if the ANUPs only maintain default routes to some hub routes in the DNs (i.e., hub-and-spoke VPN can be used to reduce host routes on most ANUPs). While there typically remain the same amount of state data (per session), there may be less state measured by total amount, for host routes are lighter-weighted than GTP session data. Host routes are only needed if persistent UE addresses after re-anchoring are desired. Additional advantages may include seamless integration with wireline services, multi-access edge computing (MEC) native, and simpler Multicast and Broadcast Services (MBS)/5GLAN, and reducing operation costs due to a combined ANUP and no separate UPF management.

Additional techniques are described for extending a Border Gateway Protocol (BGP) Mobile User Plane-Gateway architecture to the access network using ANUPs and may be advantageously combined with the ANUP techniques. ANUP is further described in U.S. Patent No. Publication 2023/0155762, published 18 May 2023, which is incorporated by reference herein in its entirety.

FIG. 1A is a block diagram illustrating an example 5G mobile network system 100. The example network system 100 implements control plane user plane separation (CUPS). CUPS refers to the separation between network management (control) functions and network data traffic forwarding (user) functions. For example, mobile network control plane functions can include user connection management, route determination, QoS (Quality of Service) policy definition and enforcement, user authentication, etc. User plane functions typically include functions that forward network traffic from one node to another. Separation between the user plane functions and mobile network control plane functions can be beneficial because it can facilitate scaling of user plane functionality separately from mobile network control plane functionality.

In the example shown in FIG. 1A, components of a control plane and a user plane of mobile network system 100 conform to 5th generation mobile network ("5G") specifications as published by 3GPP. The user plane can include components that communicatively attach user equipment (UE) 101 to data network 140. In some aspects, data network 140 can be the Internet. UE 101 can be an end-user network device that communicates with other network devices via data network 140 via an operator's access network. Examples of UE 101 can be a device that communicates with data network 140 via a wireless access network such as a 3GPP network. Such devices can include smartphones, laptops, tablet computers, Internet-of-Things devices, autonomous vehicles, etc. The techniques disclosed herein are not limited to any particular type of UE 101, mobile network system, or protocol, radio access network, or network system.

Mobile network system 100 includes one or more radio access networks (RANs) 109 and mobile core network 105. In 5G mobile systems, radio access networks 109 include gNodeBs. A gNodeB is a 3GPP-compliant implementation of a 5G base station, which implements 3GPP-compliant RAN protocols, which may include PHY, Media Access Control (MAC), Radio Link Control (RLC), Packet Data Convergence Protocol (PDCP), Service Data Adaption Protocol (SDAP), Radio Resource Control (RRC), and new radio access point (NRAP). The gNodeBs 102 may include radio units (RUs) located at various cellular network sites ("cell sites"), along with distributed units (DUs) and centralized units (CUs). The 5G RU is hardware-based for the user data plane and each RU consists of an LO PHY and a RF transmitter. The LO PHY component may be implemented using specialized hardware for high-performance packet processing. DUs and CUs are typically implemented as Network Functions (NFs), also referred to herein as Access Network functions (AN functions).

RUs connect to DUs via a fronthaul network. The fronthaul network connects LO PHY and HI PHY and is used by RUs and DUs to implement the F2 interface of 5G. DUs manage the packet transmission of radio by the RUs. In some cases, such packet transmission conforms to the Common Packet Radio Interface (CPRI) and/or to the enhanced CPRI (eCPRI) standard, or to IEEE 1914.3. DUs may implement the RLC, MAC, and the HI PHY layer. DUs are at least partially controlled by CUs.

DUs connect to CUs via the midhaul network, which may be used by DUs and CUs to implement the F1 interface of 5G. CUs may implement the RRC and PDCP layers. CUs connect to mobile core network 105 via a backhaul network. The midhaul and backhaul networks may each be wide area networks (WANs).

In some examples of radio access networks 109 of mobile network system 100, gNodeBs 102 includes one of CUs and one of DUs. A CU may support multiple DUs to implement multiple gNodeBs. One or more RUs may be supported by a single DU.

Any DU may or may not be located at the cell site that includes the RU(s) supported by the DU. A DU may be located at a cell site, while other DUs may be located at a local data center and collectively support multiple RUs. Mobile network system 100 may have radio access networks 109 that include many thousands of cell sites and gNodeBs.

Radio access networks 109 connect to mobile core network 105 to exchange packets with data network 140. Mobile core network 105 may be a 5G core network, and data network (DN) 140 may represent, for example, one or more service provider networks and services, the Internet, 3rd party services, one or more IP-VPNs, an IP-multimedia subsystem, a combination thereof, or other networks or combination of networks.

Core network 105 as implemented in 5G is a service-based architecture that includes various interconnected cloud-native network functions (NFs) having authorization to access each other's services. As illustrated, mobile network system 100 includes core network 105 that implements various discrete mobile network control plane functions for network system 100. In some aspects, core network 105 includes 5G mobile network control plane functions (network functions) such as Access Mobility Management Function (AMF) 152, Session Management Function (SMF) 153, Policy Control Function (PCF) 154, User Data Management (UDM) 155, Network Repository Function (NRF) 157, Authentication Server Function (AUSF) 156, and Network Slice Selection Function (NSSF) 159.

AMF 152 communicates with UE 101 via an N1 control interface. AMF 152 can also attach to an access network function such as a DU/CU via an N2 interface. The AMF receives all connection and session related information from the UE via the N1/N2 interfaces but is responsible only for handling connection and mobility management tasks. All messages related to session management are forwarded over the N11 interface to the SMF. SMF 153 communicates with I-UPF 144 and UPF 146 using an N4 interface. The SMF 153 handles PDU session management, IP address allocation, GTP-U tunnel management, and control of policy enforcement. PDU session management includes setup, modification, and release of PDU sessions. In general, a PDU session is a logical connection between a UE and the egress interface of a UPF towards a particular data network. In the network system of FIG. 1A, SMF 153 and AMF 152 perform PDU Session management by signaling towards UE 101, gNodeB 102, and UPFs 144, 146. SMF 153 communicates with UPFs on the N4 interface.

Figure 2:
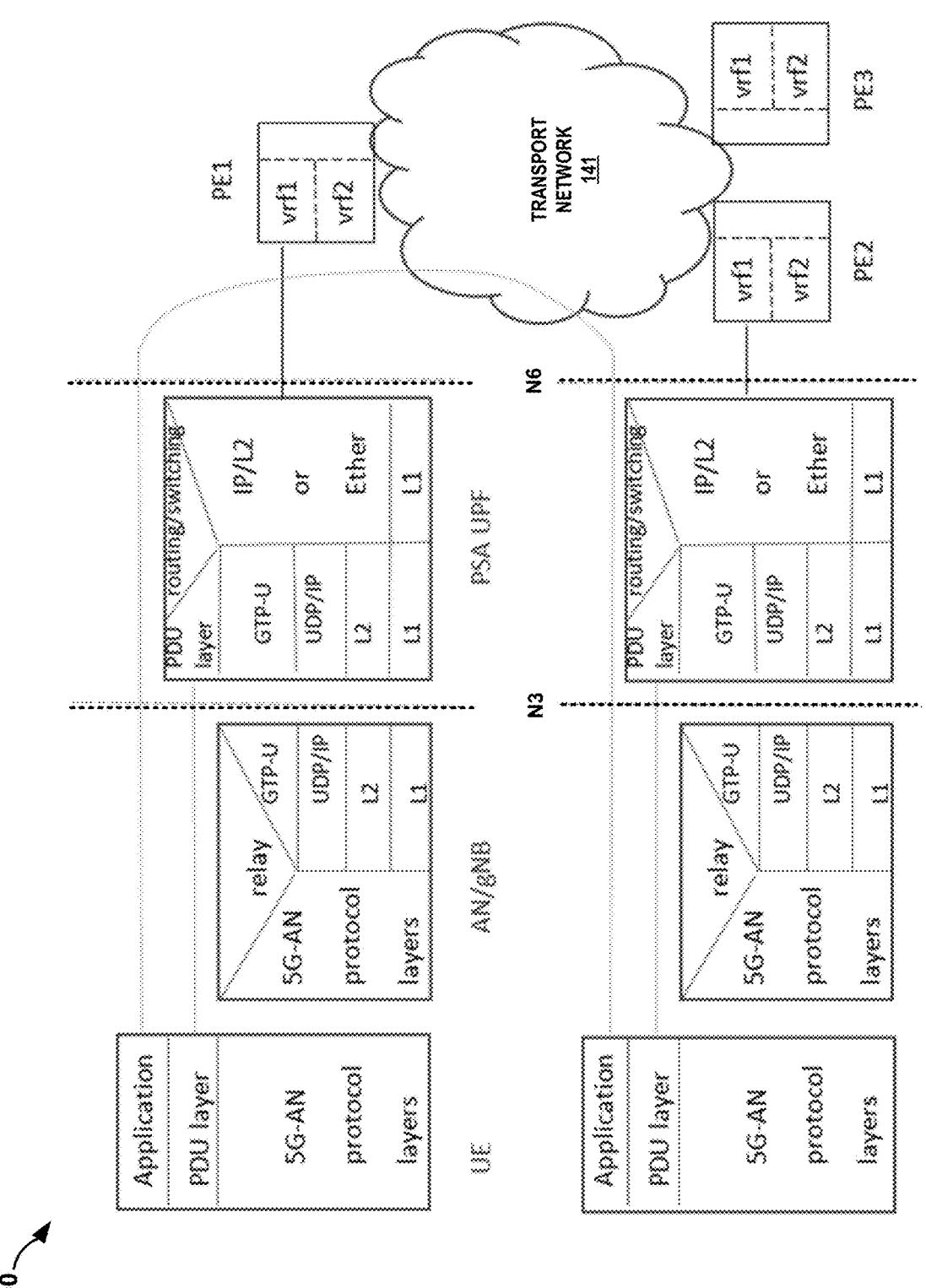
FIG. 2 is a block diagram depicting a mixed system and protocol diagram for the user plane of an example 5G mobile network system having distributed UPFs.

SMF 153 performs GTP-U Tunnel Management, which refers to managing of the GTP-U tunnel between gNodeB 102 and UPF 146 (or other UPFs). A GTP-U tunnel is used to transfer packets between gNodeB 102 and UPF 146. A GTP-U tunnel operates with an added set of IP/UDP/GTP-U headers to packets being transported between gNodeB 102 and UPF 146. The IP layer is for routing the packets between gNodeB 102 and UPF 146. The GTP-U layer specifies a Tunnel Endpoint Identifier (TEID), which identifies the GTP tunnel for the PDU session and thereby enables linking a packet to a specific PDU Session for relay (as shown in FIG. 2).

AMF 152, SMF 153, PCF 154, UDM 155, NRF 157, AUSF 156 and NSSF 159 are incorporated along with other network functions and services in core network 105. Further details on services and functions provided by AMF 152, SMF 153, PCF 154, UDM 155, NRF 157, AUSF 156 and NSSF 159 can be found in 3rd Generation Partnership Project Technical specifications.

The user plane function (UPF) in 5G is responsible for packet routing and forwarding, under the control of the SMF. A UPF generates charging data records and traffic usage records which are sent to the SMF and can perform packet inspections and apply policies. The N3 interface extends from gNodeB 102 to the Protocol Data Unit (PDU) Session Anchor (PSA) UPF (UPF 146 for UE 101 in FIG. 1A), though I-UPFs 144 may intermediate traffic between gNodeB and the PSA UPF. In such cases, the N9 interface is used between the I-UPF 144 and the PSA UPF 146, as shown in the example of FIG. 1A.

Figure 1B:
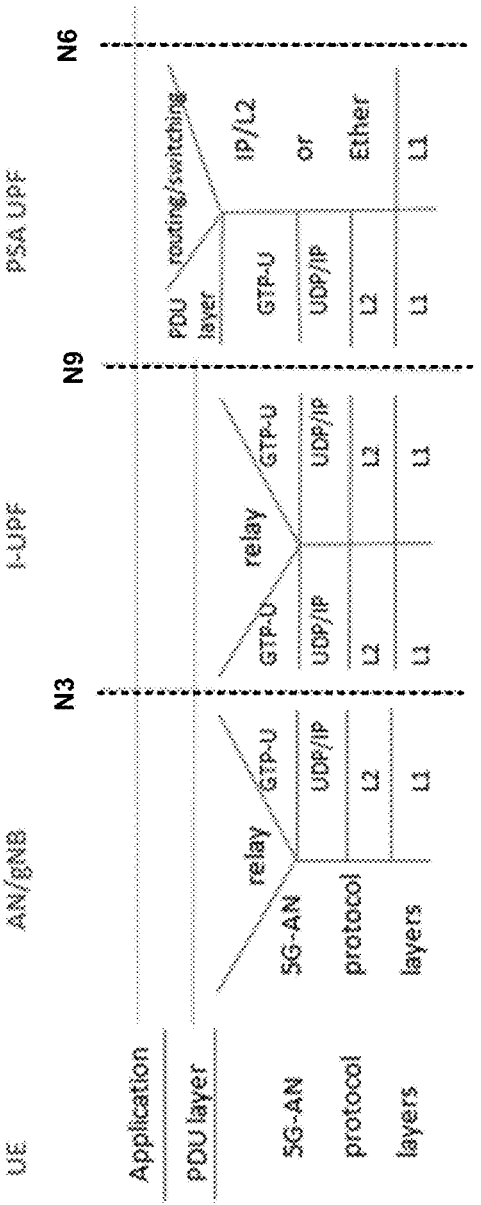
FIG. 1B is a block diagram depicting a mixed system and protocol diagram for the user plane of an example 5G mobile network system.
Figure 1B:

FIG. 1B is a block diagram depicting a mixed system and protocol diagram 110 for the user plane of example 5G mobile network system 100 of FIG. 1A. UPFs are commonly deployed at central locations and the N3/N9 tunnels extend the PDU layer from the gNodeBs to and among the UPFs. At the gNodeB 102, relay/stitching is used to connect the Service Data Adaption Protocol (SDAP) layer and the N3 interface. At I-UPF 144, relay/stitching is used to connect N3 and N9. The PSA UPF terminates the N3 or N9 tunnel and performs routing/switching (at L3/L2 level respectively) between UE 101 (over the PDU session) and data network 140.

The N3 and N9 interface are GTP-U tunnels that are typically transported using a virtual private network (VPN) implemented over a transport network 141 infrastructure. GTP-U stands for GPRS (General Packet Radio Service) Tunneling Protocol-User plane. In other words, GTP-U is used for carrying user data within the core network 105 and between the radio access network and the core network 105. The user data transported can be packets in any of IPV4, IPv6, or PPP formats. Transport network 141 may represent a Mobile Network Operator (MNO) network and may include infrastructure in common with core network 105.

User data between the core network 105 and a network such as transport network 141/data network 140 uses a N6 interface. While N6 is a 3GPP-defined interface, it is merely for reference—there is no tunneling or specification involved. The N6 interface is simply a direct IP (in case of IP PDU session) or Ethernet (in case of Ethernet PDU session) connection with data network 140.

FIG. 2 is a block diagram depicting a mixed system and protocol diagram 200 for the user plane of a 5G mobile network system having distributed UPFs. In this case, there is no N9 interface and the PSA UPFs 146 interface with gNodeBs via an N3 interface. In other words, a centralized PSA UPF is no longer needed in the deployment shown in FIG. 2. Rather, a UE may have its session anchor migrate among multiple UPFs distributed in the mobile core network, for example at the access edge. In this example, multiple UPFs 146 are connected to the same data network that is instantiated as a VPN configured in transport network 141 having provider edge (PE) routers PE1, PE2, and PE3. Each of the PE1, PE2, and PE3 has configured thereon virtual routing and forwarding instances (VRFs) (vrf1 and vrf2) for respective IP VPNs. IP VPNs are described in further detail in "BGP/MPLS IP Virtual Private Networks (VPNs)," Internet Engineering Task Force Network Working Group, Request for Comments 4364, February 2006, which is incorporated by reference herein in its entirety.

The example deployment in FIG. 2 may be a common deployment that facilitates multi-access edge computing (MEC), formerly known as mobile edge computing. Edge cloud is an evolution of cloud computing, which enables application hosting and data processing to move from centralized data centers to the network edge. Cloud capabilities are distributed across the network, which is particularly helpful for applications that need low-latency and/or high-bandwidth.

ETSI has defined a set of technical standards for Multi-Access Edge Computing (MEC) with the objective of enabling an open ecosystem for service providers and third parties to flexibly and rapidly deploy applications with real-time access to radio network information for optimization. It is generally agreed that MEC is one of the key enabling technologies for 5G, particularly for its ability to flexibly offload traffic through the UPF and its open environment for enabling diverse vertical apps and services.

With MEC, more UPFs are distributed closer to gNodeBs. In that case, the N3 interface becomes very simple—over a direct or short transport connection between, e.g., gNodeB 102 and UPF 146 or even an internal connection if gNodeB 102 and UPF 146 are hosted on the same server. On the other hand, since the UPF 146 to data network 140 connection is direct, the data network becomes a VPN (e.g., IP VPN in case of IP PDU sessions) over a transport infrastructure, most likely the same transport infrastructure for the VPN supporting the N3/N9 tunneling.

Thus, with distributed UPFs in a 5G network, as shown in FIG. 2 where the transport network infrastructure has elements in common with data network 140, data network 140 providing data packet services to UE can be an IP-VPN corresponding to any of vrf1 and vrf2.

VPN standards are defined in RFC 4364 and other IETF standards and have been widely deployed in wireline networks. In FIG. 2, the UPFs act as Customer Edge devices (CEs) connected to the PEs. In FIG. 2, PE3's VRFs could, for instance, connect to VPN sites on the wireline side, including the internet.

FIG. 2 illustrates two PSA UPFs and two access network/gNodeBs. If it is necessary for a UE to maintain a persistent IP address as it is re-anchored to different distributed UPFs, a UPF that is anchoring may announce IP host routes (e.g., /32 routes) with the persistent IP address for the UE. Once such a UE de-anchors for a UPF, the UPF may withdraw the host route.

Figure 3A:
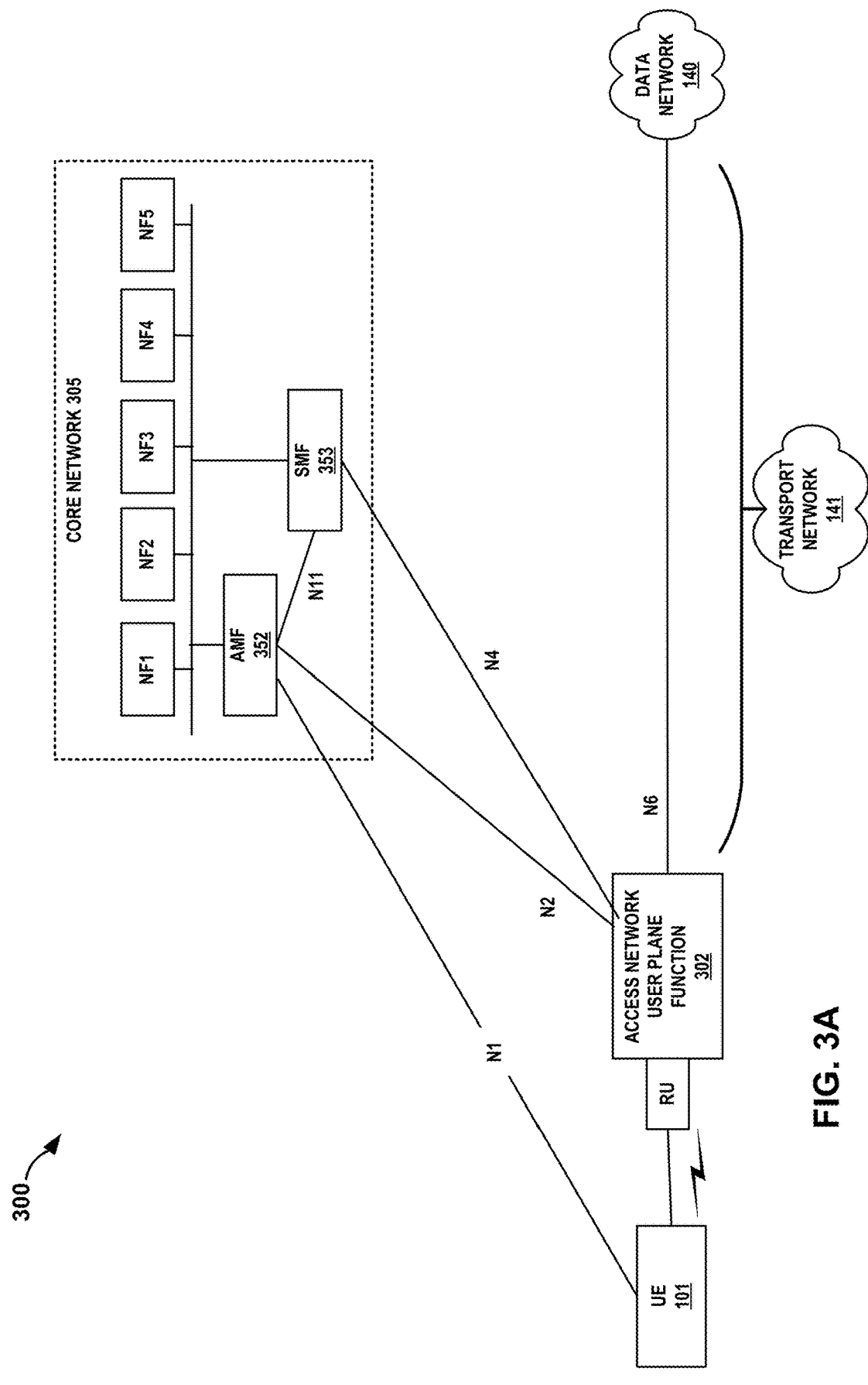
FIG. 3A is a block diagram illustrating an example mobile network system in which an access network user plane function (ANUP) implements a combined access network/gNodeB and User Plane Function.

FIG. 3A is a block diagram illustrating a mobile network system 300 having a radio access network in which access network user plane function (ANUP) 302 implements combined access network functions and User Plane Function. In some examples, mobile network system 300 is an xG mobile network system having a mobile network in which an ANUP implements a combined access network/gNodeB and User Plane Function. As shown in FIG. 3A, a UE 101 connects via an over the air radio connection to an RU, which communicates with the ANUP 302. ANUP 302 may be implemented by one or more servers, appliances or other physical network functions, or other computing devices. ANUP 302 terminates a PDU session with UE 101 and also has an N6 interface with data network 140. Transport network 141 may include one or more PE routers, P routers, switches, and other network devices to implement an IP and/or L2 layer to transport IP and/or Ethernet packets among different instances of ANUPs between end-user applications operating on UEs and between ANUPs 302 and data network 140 services. Transport network 141 and a data network 140 may have at least some common infrastructure. Data network 140 may represent an IP VPN or other Layer 3 VPN, the internet, cloud service provider network, an IP Multimedia Subsystem (IMS), or other data network or packet data network (PDN).

The ANUP 302 communicates with various network functions (illustrated as NF1, NF2, NF3, etc.) of core network 305. In the illustrated example, AMF 352 and SMF 353 have interfaces N2 and N4, respectively, with ANUP 302 for the different functions, which could be like those of an example 5G network, as described with respect to FIG. 1A. In some examples, core network 305 may include other or different network functions or combinations of functions. For example, AMF/SMF may also be combined into a single function and N2/N4 combined into a common interface.

Figure 3B:
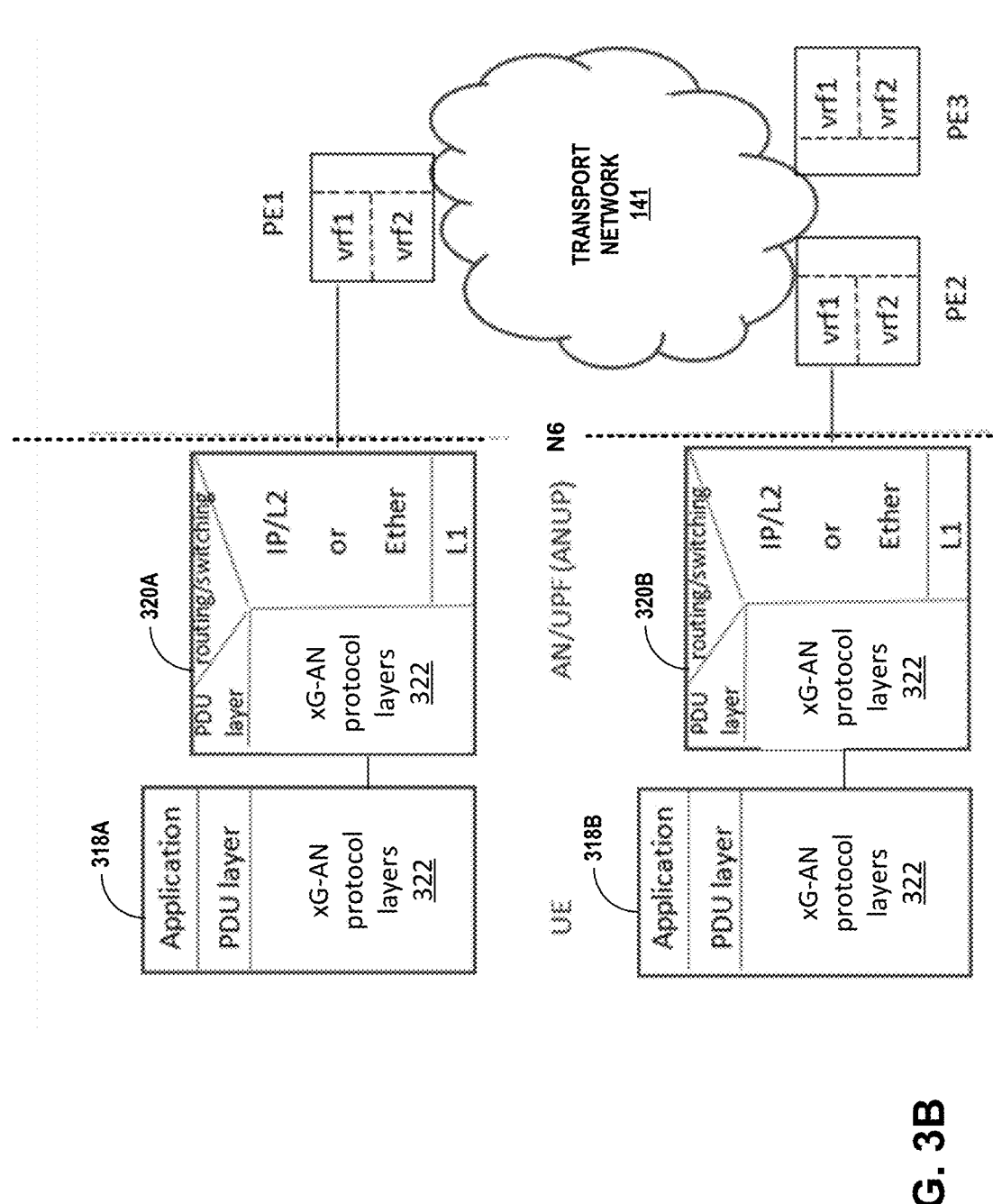
FIG. 3B is a block diagram depicting a mixed system and protocol diagram for the user plane of an example xG mobile network system that may be considered a further evolution of the distributed UPF deployment and implementation of a mobile network system as depicted in FIG. 2.

FIG. 3B is a block diagram depicting a mixed system and protocol diagram 310 for an example instance of at least a portion of mobile network system 300 shown in FIG. 3A, and which may be considered a further evolution of the distributed UPF deployment and implementation of a mobile network having distributed UPFs (with protocol layers depicted in FIG. 2), according to techniques of this disclosure. UEs 318A-318B (collectively, "UEs 318") are example instances of user equipment. In FIG. 3A, the UPF and access network functions are integrated into the access network user plane function (ANUPs) 320A-320B (collectively, "ANUPs 320"), each of which may represent an example instance of ANUP 302 of FIG. 3A. Each of ANUPs 320 executes access network protocols for the generation of 3GPP mobile network in which the ANUP is deployed. This may be for future, as-yet-unspecified access network protocols, such as 6G, 7G, xG, and so on, and for this reason the protocol layers are illustrated and referred to herein as xG-AN protocol layers 322. xG-AN protocol layers 322 may implement any one or more of the 3GPP-compliant RAN protocols listed above, i.e., PHY, MAC, RLC, PDCP, SDAP, RRC, or NRAP that are defined for 5G. xG-AN protocol layers 322 may include other access network protocol layers, newly defined for an xG mobile network, to support a PDU layer between UEs 318 and ANUPs 320 for UE connections. xG-AN protocol layers 322 may support RAN protocols.

Protocol data unit (PDU) sessions terminate on the ANUPs 320, which perform routing/switching between the two stacks (the PDU/xG-AN stack (3GPP) and the IP/L2 stack (IETF)). Although N6 interface is illustrated in FIG. 3B, N6 interface may be eliminated, renamed, or considered merely for reference in xG.

In this flattened architecture, IETF and 3GPP technologies are applied where they are best applicable—3GPP for the radio access network and IETF for the rest, e.g., transport network and data network. As IETF technologies continue to evolve, they can be automatically applied in mobile networks without any changes in 3GPP architecture/specification. For example:

Any kind of tunnels can be used, such as MPLS or SRv6, which may avoid the overhead of UDP/GTP encapsulation as in 3GPP networks on the N3/N9 interfaces. Network slicing function is supported (the transport network needs to instantiate the slices for N3/N9 tunnels as well).

5G-LAN and MEC become native applications (PDU sessions terminate into the closest ANUP and are routed/switched to different data networks).

Multicast and Broadcast Services (MBS) becomes very simple—the ANUP gets the multicast traffic from the DN and may then use either a shared radio bearer or individual bearers to send to interested UEs.

In some examples, because ANUPs 320 implements the routing/switching functions, one or more of the PE functions could be optionally integrated into the ANUPs 320, further optimizing end-to-end communications by reducing NFs and connections between them. In fact, the current 5G gNodeB N3 tunneling function is similar to pseudowire (PW) PE function, as described in further detail below.

The compressed user plane architecture techniques described herein may be used in further iterations of 3GPP standards, such as 6G/7G/xG (designated herein as "xG" network systems) with an integrated AN/UP NF (ANUP) that optionally provides the VPN function. The techniques make significant use of the IETF/wireline technologies and provide integrated services for both wireline/fixed and wireless/mobile customers. At least in some examples, the techniques may not require changes in the control plane, though the control plane may be optimized for the compressed user plane.

The following sub-sections describe how some existing functionalities are supported with the new architecture.

Handover

For IP PDU sessions, a UE may be assigned different IP addresses each time it anchors at a different UPF if session continuation is not an issue (e.g., the applications may be able to deal with changing addresses). For this situation, no special handling is needed.

If needed, persistent IP addresses may be assigned even when UEs move from one ANUP to another. To handle mobility and handover, each ANUP announces host routes for UEs anchored to itself. When a UE de-anchors from an ANUP, that ANUP withdraws the host route.

For example, if a UE moves from ANUP2 to ANUP1, originally, ANUP2 advertises the UE address. After the UE moves to ANUP1, ANUP1 advertises the UE address and ANUP2 withdraws the route. Traffic from the DN to the UE is sent (in the DN) to ANUP1, who then routes to the UE. There could be inflight traffic that was sent (in the DN) towards ANUP2. Any node in the path (include ANUP2 itself) would redirect the traffic to ANUP1 as soon as the host route advertised from ANUP1 becomes the active route on that node.

An ANUP may retain host routes advertised by other ANUPs. In that case, UE to UE traffic will take the short ANUP-ANUP path. It could also be that an ANUP only maintains host routes that it advertises and a default route to a hub router on the DN. That way, UE to UE/internet traffic may go through the hub. Notice that from traffic path point of view, this is similar to 5G central UPF scenario (the central UPF corresponds to the hub router in the new user plane architecture), except that in 5G case traffic is sent over N3 tunnel to/from the central UPF while in the new architecture the traffic is routed to/from the hub router (in a VPN). Additionally, while the hub router needs to maintain all host routes, the number of host routes are directly comparable to the number of per-session state (PDRs/FARs) that a 5G UPF maintains.

For the same reason, maintaining the host routes inside the DN is similar to maintaining the per-session state in the 5G case. Even if the DN is "Internet" (e.g. the UE is a "consumer" UE and not a "business" UE that accesses a company intranet), the host routes are not advertised to the public internet. The host routes are instead confined to the internal part of the "internet access network" of the operator.

Note that the above for IP PDU session in the new architecture is very similar to the Ethernet PDU sessions—even in 5G (switching is based on individual "host" mac addresses and the mac address will not change when a UE moves from one ANUP to another).

Lawful Intercept, Accounting, etc.

These functions are merged into the ANUP and may continue to work similarly as in 5G systems.

Per-Flow QoS

If the traffic to/from a UE is from/to another UE on the same anchoring ANUP, all QoS related handling need only involve that ANUP.

Otherwise, the traffic needs to go through another ANUP or hub router over VPN underlay tunnels.

QoS marking is done in the VPN tunnel encapsulation.

For comparison, in case of N3 tunneling, QoS marking is done both in the IP/UDP header and the GTP header.

Traffic shaping can be done at two levels:

a. On the radio link by the ANUP b. On the hub→ANUP tunnel by the hub to prevent an ANUP being overwhelmed by from—internet traffic. This can be done at the per-session (host route) level-just as in the 5G case it can be done at per-session (N3 tunnel) level. The QoS parameters (as learned via N4 signaling) can be advertised by the PSA UPF along with the host routes so there is no need for modification or additional requirements imposed to AMF/PCF/other core functions.

While it is most likely not needed on the ANUP→ANUP/ hub tunnel, traffic shaping can be done at per-session (host route) level by the source ANUP as well.

Security

Encryption between UE and ANUP may be similar or the same as between UE and gNodeBs in 5G. Previous encryption between gNB and UPF is no longer needed because they are now a single entity. ANUP-ANUP/hub encryption can be done as with existing VPN deployment (though if the transport infrastructure is already secure then there is no requirements for security at VPN level).

There are cases where separate AN and UP functions may be desired. For example, home routed roaming (where subscribers access a visited network via its RAN but receive services provided by their home networks) require separate HPLMN UPFs and VPLMN ANs. In another example, an MNO (mobile network operator) may want to deploy one UPF for a cluster of access networks in proximity in some locations. Further, an MNO may support VMNOs (virtual mobile network operators) who have their own UP functions but make use of the hosting MNO's access networks. In these examples, tunneling is required between ANs and UPs. In such cases, the tunneling can be achieved via IEFT's pseudo wire technology as described below.

Home Routed Roaming

Figure 4:
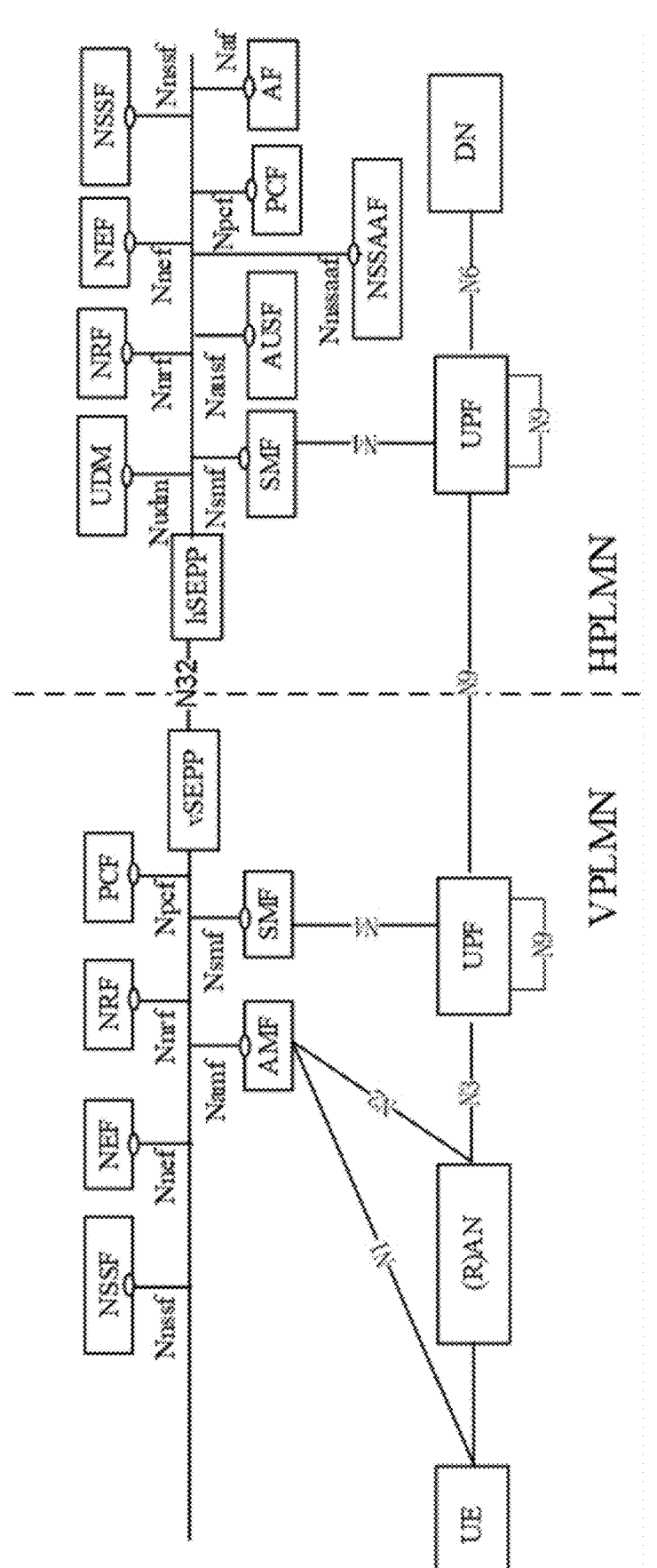
FIG. 4 is a block diagram depicting network functions and interfaces for Public Land Mobile Networks (PLMNs) including a VPLMN (Visited PLMN) and an HPLMN (Home PLMN).

FIG. 4 is a block diagram depicting network functions and interfaces for Public Land Mobile Networks (PLMNs) including a VPLMN (Visited PLMN) and an HPLMN (Home PLMN). With respect to roaming, local breakout (LBO)-based roaming can be naturally supported in the new architecture, in that the AN and UP functions remain in the visitor network. However, with Home Routed roaming in 5G, the N3 tunnel from the visitor network (VPLMN) extends to N9 and terminates in the UPF in the home network (HPLMN), as depicted in FIG. 4.

In an architecture implemented and deployed in accordance with techniques described herein, while a UPF can terminate non-roaming UE's PDU session, the UPF cannot terminate a home-routed roaming UE's PDU session—the PDU session needs to be extended to a UPF in the Home Public Land Mobile Network (HPLMN). That can be done via mature Pseudo Wire technology defined in IETF as explained below. Pseudo Wires are described in "Pseudo Wire Emulation Edge-to-Edge (PWE3) Architecture," Internet Engineering Task Force, Request for Comments 3985, March 2005, which is incorporated by reference herein in its entirety.

Request for Comments (RFC) 3985 describes:

---

This document an architecture for Pseudo Wire Emulation Edge-to-Edge (PWE3) in support of [RFC3916]. It discusses the emulation of services such as Frame Relay, ATM, Ethernet, TDM, and SONET/SDH over packet switched networks (PSNs) using IP or MPLS.

It presents the architectural framework for pseudo wires (PWs), defines terminology, and specifies the various protocol elements and their functions.

. . .

PWs provide the following functions in order to emulate the behavior and characteristics of the native service.

Encapsulation of service-specific PDUs or circuit data arriving at the PE-bound port (logical or physical).

Carriage of the encapsulated data across a PSN tunnel.

Establishment of the PW, including the exchange and/or distribution of the PW identifiers used by the PSN tunnel endpoints.

Managing the signaling, timing, order, or other aspects of the service at the boundaries of the PW.

Service-specific status and alarm management.

. . .

The payload is classified into the following generic types of native data units:

Packet

Cell

Bit stream

Structured bit stream

Within these generic types there a

| Generic Payload Type | PW Service |
| --- | --- |
| Packet | Ethernet (all types), HDLC framing, Frame Relay, ATM AAL5 PDU. |
| Cell | ATM. |
| Bit stream | Unstructured E1, T1, E3, T3. |
| Structured bit stream | SONET/SDH (e.g., SPE, VT, NxDS0). |

---

When applied to extend the Home Routed roaming PDU session to the HPLMN, the payload type is "Packet"-IP packet or Ethernet frame (that is, the layer over the SDAP layer between UE and local gNodeB) for IP or Ethernet PDU session, respectively. In the case of an Unstructured PDU session type, the PW payload type would be "Bit stream".

Figure 5:
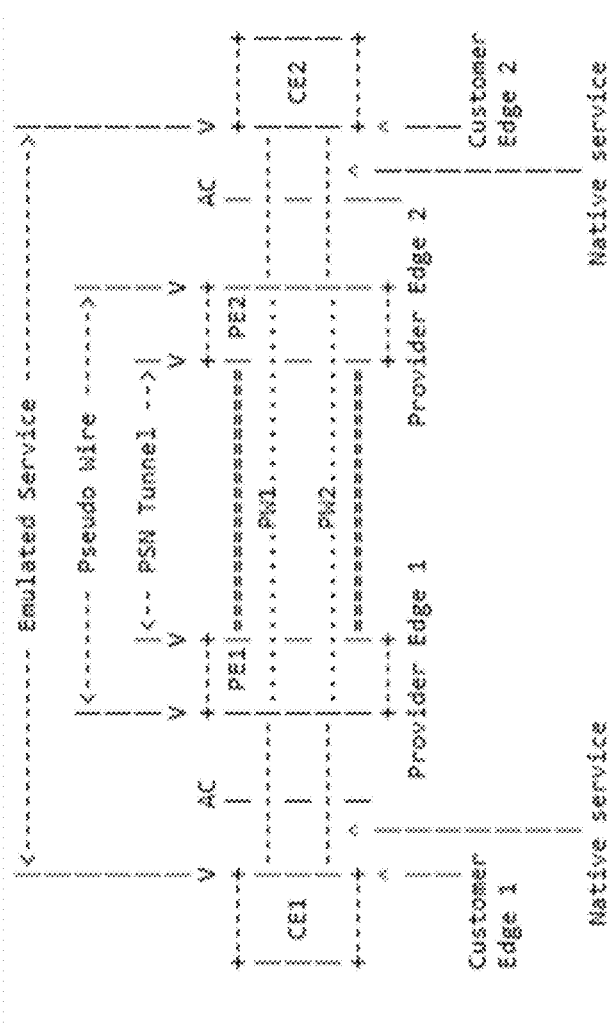
FIG. 5 is a block diagram depicting the Network Reference Model for Pseudo Wire (PW) Emulation.

FIG. 5 is a block diagram depicting the Network Reference Model for Pseudo Wire Emulation according to RFC 3985. This model can be mapped to the mobile user plane architecture implemented and deployed according to techniques described in this disclosure.

Figure 6:
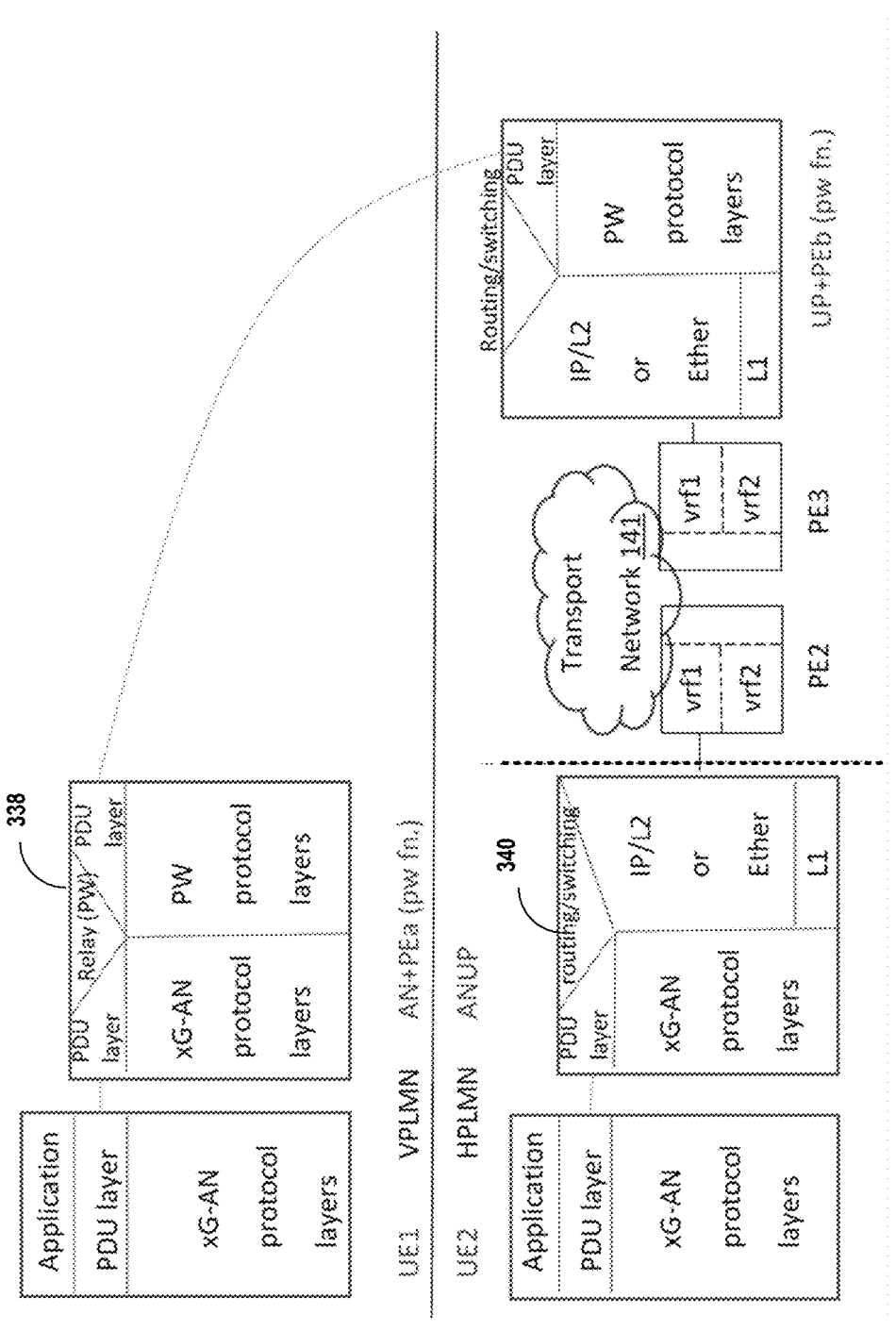
FIG. 6 is a block diagram depicting example protocol stacks in Home Routed roaming.

FIG. 6 is a block diagram depicting example protocol stacks in Home Routed roaming. PE2 & PE3 are for the DN VPN, and PEa & PEb are for the PWs for roaming purposes. In this example depiction, UE1 is roaming while UE2 is not. UE1 connects to an ANUP 338 of a visitor network, denoted as VPLMN, wherein a pseudo wire acts to connect to an ANPU 340 of UE1's home network, denoted as HPLMN.

The following help illustrate the mapping to the mobile user plane architecture:

Customer Edge 1 (CE1) in FIG. 5 corresponds to a roaming UE and Provider Edge 1 (PE1)/AN corresponds to the ANUP 338 in a Visited PLMN (though it does not terminate the PDU session but extends it to a PW).

The radio link between CE1/UE1 and PE1/ANUP 338 is the AC in PW architecture. PDU session is the Emulated Service. Pseudo Wire corresponds to the N3/N9 tunnel in 5G. PSN tunnel corresponds to the UDP tunnel that transports the N3/N9 in 5G.

Provider Edge 2 (PE2) and Customer Edge 2 (CE2) together correspond to the ANUP 340 in HPLMN in the new architecture. It could be viewed that the PE2 provides AN function (with the PW corresponding to the radio link) and CE2 provides the UPF function.

PE1 receives the PDU packet from UE (after decapsulate the SDAP stack), which is treated as PW payload, and sends to PE2 over the PW. PE2 decapsulates the PW encapsulation and exposes the PDU (in like manner that a gNodeB decapsulates the SDAP stack), which is then terminated by CE2 (though PE2 and CE2 are integrated into a single ANUP, in accordance with techniques of this disclosure).

In 5G Home Routed roaming architecture, there is a pair of I-UPFs between the two PLMNs—the N3 tunnel does not extend directly from a VPLMN's AN to a HPLMN's UPF. The same concept also exists in VPN technology—the I-UPFs may function similarly to a pair of ASBRs that provide Option-B inter-AS VPN services.

Alternatively, in some examples, N3/N9 tunneling can still be used instead (though one of the motivations of this new architecture is to remove the N3/N9 tunneling so this is only an alternative embodiment, if N3/N9 tunneling must be used).

Virtual Mobile Network Operator (VMNO) and UP for a Cluster of ANs

It is possible that an operator may not be able to (or may not desire to) fully distribute the UPF to the access nodes. The operator may instead deploy a more centralized UPF for a cluster of access nodes in proximity.

An operator may support "Full VMNOs," which only lack their own radio networks. In that case, tunneling from AN/ANUP to the mobile virtual network operator (MVNO)'s UP/UPF is also needed. Like the roaming case, Pseudo Wires (or even N3/N9) can be used for these scenarios as described in the preceding paragraphs.

Figure 7:
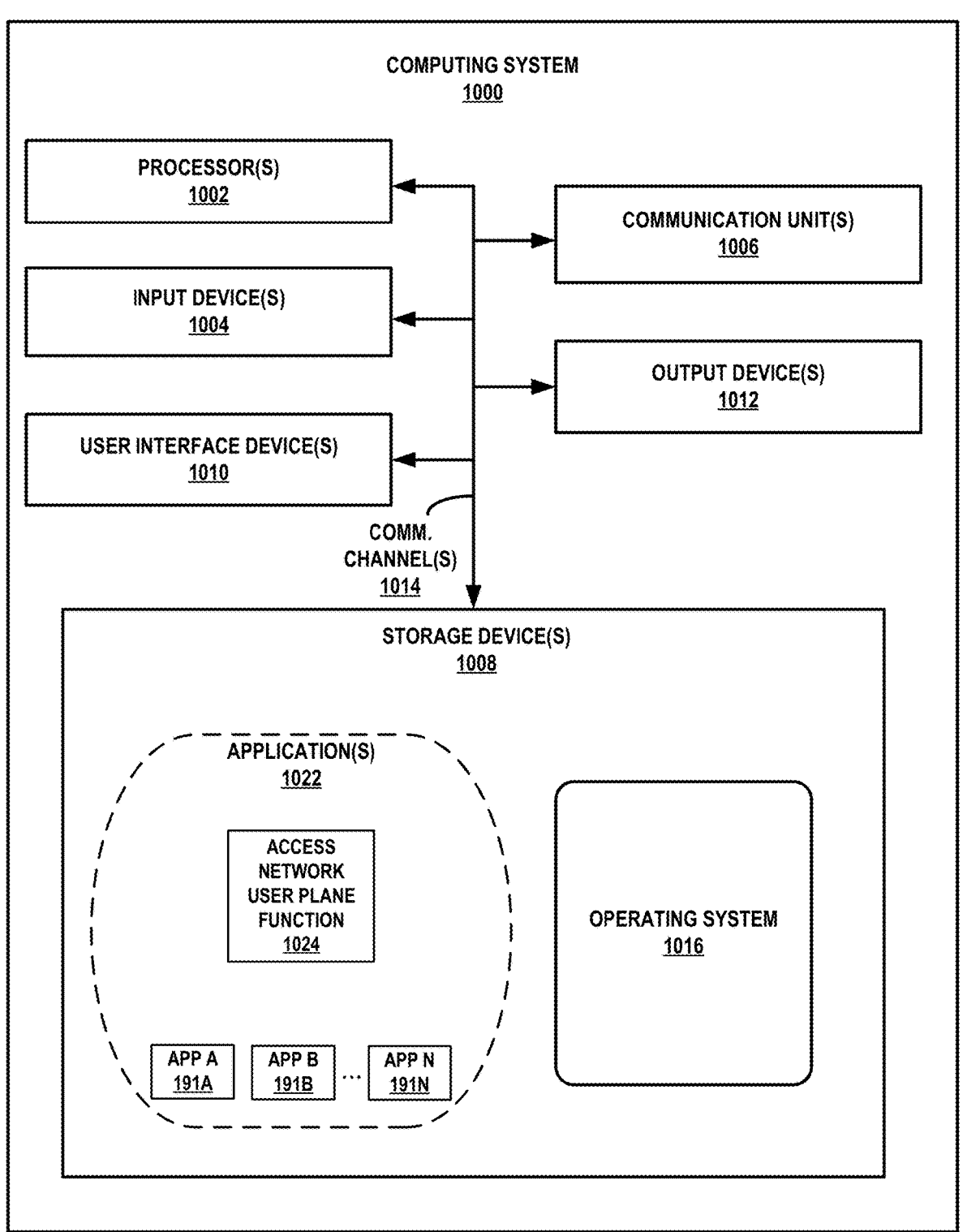
FIG. 7 is a block diagram illustrating details of one example of a computing device that operates in accordance with one or more techniques of the present disclosure.

FIG. 7 is a block diagram illustrating details of one example of a computing device that operates in accordance with one or more techniques of the present disclosure. FIG. 7 may illustrate a particular example of server(s) or other computing system 1000 that includes one or more processor (s) 1002 for executing any one or more of access network user plane function (ANUP) 1024, applications 191A-191N, other applications 1022, or any other system, application, node software, or module described herein. Other examples of computing system 1000 may be used in other instances. Although shown in FIG. 7 as a stand-alone computing system 1000 for purposes of example, computing system 1000 may be any component or system that includes one or more processors or other suitable computing environment for executing software instructions and, for example, need not necessarily include one or more elements shown in FIG. 7 (e.g., communication units 1006; and in some examples components such as storage device(s) 1008 may not be co-located or in the same chassis as other components). As shown in the specific example of FIG. 7, computing system 1000 includes one or more processors 1002, one or more input devices 1004, one or more communication units 1006, one or more output devices 1012, one or more storage devices 1008, and user interface (UI) device 1010. Computing system 1000, in one example, further includes one or more applications 1022 and operating system 1016 that are executable by computing system 1000. Each of components 1002, 1004, 1006, 1008, 1010, and 1012 are coupled (physically, communicatively, and/or operatively) for inter-component communications. In some examples, communication channels 1014 may include a system bus, a network connection, an inter-process communication data structure, a message bus, or any other method for communicating data. As one example, components 1002, 1004, 1006, 1008, 1010, and 1012 may be coupled by one or more communication channels 1014.

Processors 1002, in one example, are configured to implement functionality and/or process instructions for execution within computing system 1000. For example, processors 1002 may be processing circuitry capable of processing instructions stored in storage device 1008. Examples of processors 1002 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1008 may be configured to store information within computing system 1000 during operation. Storage device 1008, in some examples, is described as a computer-readable storage medium. In some examples, storage device 1008 is a temporary memory, meaning that a primary purpose of storage device 1008 is not long-term storage. Storage device 1008, in some examples, is described as a volatile memory, meaning that storage device 1008 does not maintain stored contents when the computer is turned off. Examples of volatile memories include random access memories (RAM), dynamic random access memories (DRAM), static random access memories (SRAM), and other forms of volatile memories known in the art. In some examples, storage device 1008 is used to store program instructions for execution by processors 1002. Storage device 1008, in one example, is used by software or applications running on computing system 1000 to temporarily store information during program execution.

Storage devices 1008, in some examples, also include one or more computer-readable storage media. Storage devices 1008 may be configured to store larger amounts of information than volatile memory. Storage devices 1008 may further be configured for long-term storage of information. In some examples, storage devices 1008 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing system 1000, in some examples, also includes one or more communication units 1006. Computing system 1000, in one example, utilizes communication units 1006 to communicate with external devices via one or more networks, such as one or more wired/wireless/mobile networks. Communication units 1006 may include a network interface card, such as an Ethernet card, an optical transceiver, a radio frequency transceiver, or any other type of device that can send and receive information. In some examples, computing system 1000 uses communication unit 1006 to communicate with an external device.

Computing system 1000, in one example, also includes one or more user interface devices 1010. User interface devices 1010, in some examples, are configured to receive input from a user through tactile, audio, or video feedback. Examples of user interface devices(s) 1010 include a presence-sensitive display, a mouse, a keyboard, a voice responsive system, video camera, microphone or any other type of device for detecting a command from a user. In some examples, a presence-sensitive display includes a touch-sensitive screen.

One or more output devices 1012 may also be included in computing system 1000. Output device 1012, in some examples, is configured to provide output to a user using tactile, audio, or video stimuli. Output device 1012, in one example, includes a presence-sensitive display, a sound card, a video graphics adapter card, or any other type of device for converting a signal into an appropriate form understandable to humans or machines. Additional examples of output device 1012 include a speaker, a cathode ray tube (CRT) monitor, a liquid crystal display (LCD), or any other type of device that can generate intelligible output to a user.

Computing system 1000 may include operating system 1016. Operating system 1016, in some examples, controls the operation of components of computing system 1000. For example, operating system 1016, in one example, facilitates the communication of one or more applications 1022 including ANUP 302 with processors 1002, communication unit 1006, storage device 1008, input device 1004, user interface devices 1010, and output device 1012.

Applications 1022 may also include program instructions and/or data that are executable by computing system 1000. Example applications 1022 executable by computing system 1000 may include application and/or other software to implement capabilities described above. For example, applications 1022 can include applications 191A-191N to implement services.

Access network user plane function 1024 is a network function that implements both a 3GPP access network protocol layer stack (e.g., xG-AN protocol layers) to support a PDU layer and an IETF network stack and performs routing/switching between the PDU layer and the IETF stacks. In some cases, the PDU layer may be IPV4/IPv6 or Ethernet. Access network user plane function 1024 may be implemented and deployed as one or more of a virtual machine, a bare metal server application, a process, and/or a container, for example. As such, access network user plane function 1024 may be a virtualized network function (VNF)

or cloud-native/containerized network function (CNF) that is deployed to computing system 1000.

Computing system 1000 may represent an example instance of any of the ANUP devices or systems described in this disclosure, such as ANUP 302, ANUPs 320, ANUP 340, or ANUPs 1402. ANUP 1024 performs operations or other functionality ascribed to such ANUP devices or systems. Depending on the context in which the term is used in this disclosure, "access network user plane function" may refer to a software-implemented network function or to a hardware computing device, system, appliance, or other system that implemented an access network user plane function. This is usage is understood to those of skill in the art of mobile networks. The phrase "access network user plane" can be used herein as shorthand for or as an abbreviation of access network user plane function.

Figure 8:
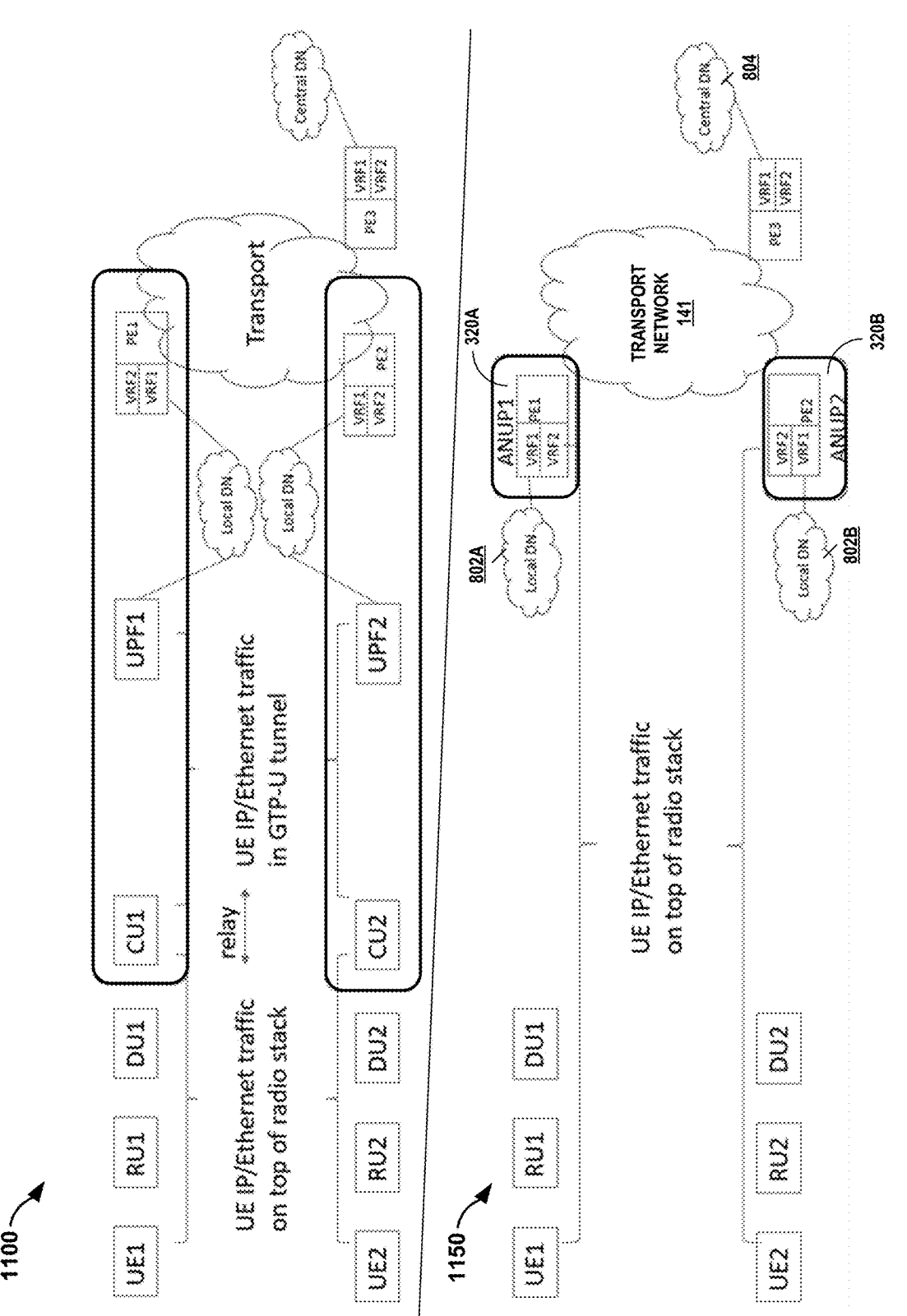
FIG. 8 is a block diagram illustrating an example mobile network system in which PE devices, UPFs, and CUs have been consolidated into ANUPs while still offering local breakout to local DNs and connectivity to a central DN.

FIG. 8 is a block diagram illustrating an example mobile network system in which PE devices, UPFs, and CUs have been consolidated into ANUPs while still offering local breakout to local DNs and connectivity to a central DN.

System 1100 depicts a conventional 5G mobile network with a RAN. As also shown in FIG. 2, UEs UE1 and UE2, Radio Units RU1 and RU2, and Decentralized Units DU1 and DU2 implement radio access network protocol layers. UPFs UPF1 and UPF2 implement IP/Ethernet and tunnel, using GTP, PDU traffic to and from the Central Units CU1 and CU2. CU1 and CU2 relay traffic between the PDU session and a GTP tunnel based on a first mapping from an Uplink (UL) radio bearer for the PDU session to a UL GTP Tunnel Endpoint IDentifier (TEID), and based on a second mapping from a DL TEID to Downlink (DL) radio bearer for the PDU session.

Figure 9:
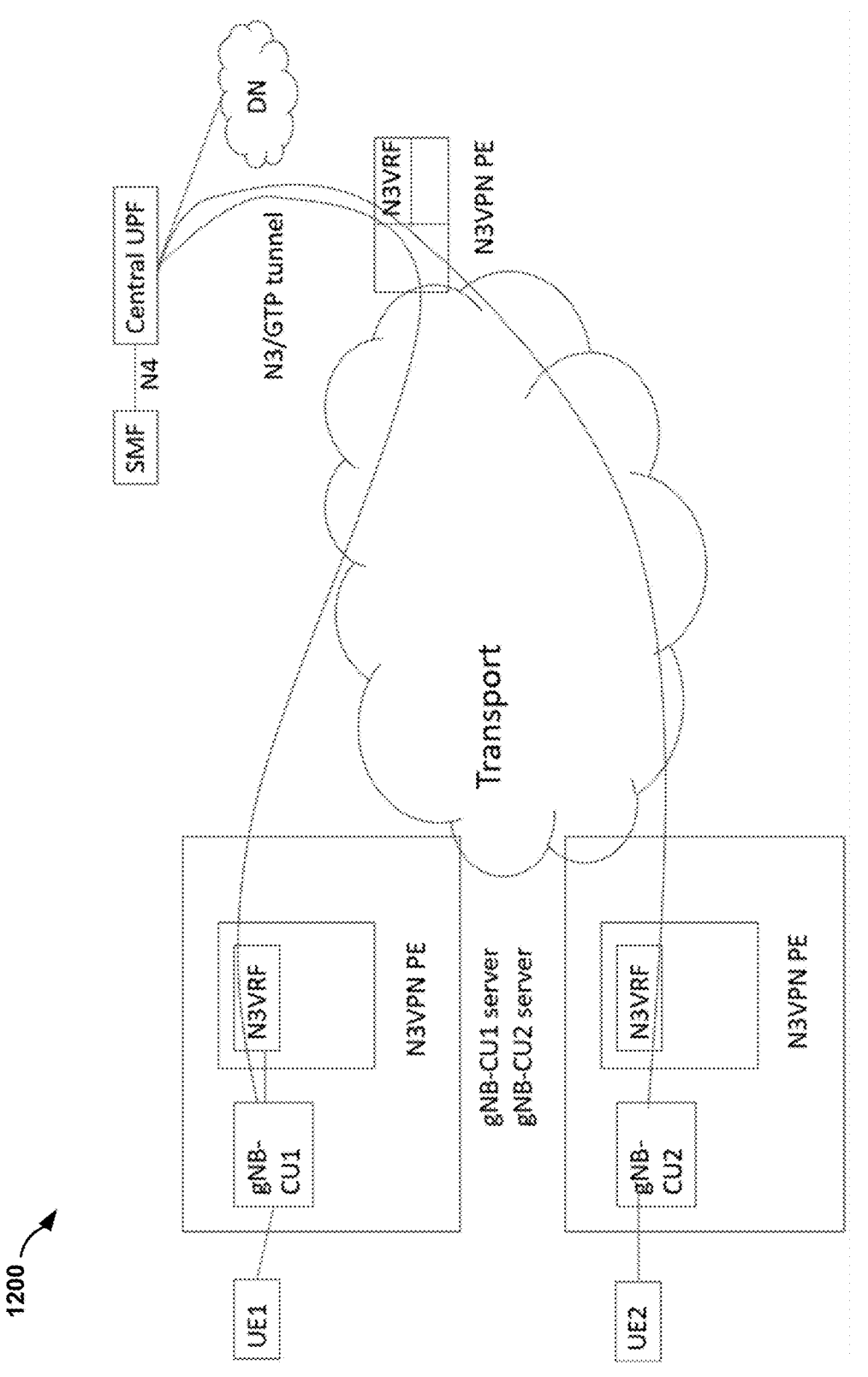
FIG. 9 is a block diagram depicting a network system implementing conventional routing/switching in a transport network underlying the network system.

FIG. 9 is a block diagram depicting an example network system in which provider edge devices of a transport network implement a VPN to transport traffic between a central UPF and a gNodeBs for a mobile network RAN. System 1200 implements a mobile network, such as a 5G mobile network. System 1200 includes N3VPN PEs that are provider edge devices for a transport network. The N3VPN PEs use respective routing instances (N3VRFs—virtual routing and forwarding instances in this example) to implement a IP-VPN. Example techniques for implementing an IP-VPN are described in Request for Comments 4364, "BGP/MPLS IP Virtual Private Networks (VPNs)," February 2006, which is incorporated by reference herein in its entirety.

In System 1200, the SMF and central UPF communicate on the N4 interface. The Central UPF and gNodeB CUs CU1 and CU2 tunnel PDU traffic for UEs UE1 and UE2 via GTP tunnels on the N3 interface (N3/GTP tunnels). System 1200 involves N3 tunneling over an IP network using IP-VPN (IP transports—the "N3 VPN") using GTP. This requires significant overhead, with 3 IP headers for each packet between a UE and a destination: the packet header, an IP/UDP/GTP header for transport between CU and central UPF, and an IP-VPN header for the N3 VPN. Extending MUP techniques to the access network using a ANUP, in accordance with techniques of this disclosure, reduces the number of headers required for leveraging an IP-VPN transport network.

Returning to FIG. 8, system 1150 depicts a modification to system 1100 in which the CU and UPF pairs are combined into ANUPs 320A-320B (collectively, "ANUPs 320"). The ANUP devices or systems described above thus involve a co-located AN (gNB-CU) and UPF integrated into a single ANUP. ANUPs 320 have the advantages of:
No N3 tunneling—optimized data plane No signaling needed for the N3 tunnel—reduced/simplified signaling (with signaling changes in 6G—referred to as "6G ANUP")
Unified router/switch-based architecture for wireline and wireless networks. A PDU session is no different from an Ethernet or a Wi-Fi connection between the UE and a router/switch. Therefore, no special procedures are needed for MEC, MBS, or LAN-type services.

With respect to ANUP 320A, for instance, for ANUP 320A to be deployed in a 5G network, N3 tunneling can be removed in 5G without signaling changes. ANUP 320A continues separate 5G N2/N4 signaling (this is referred to as "5G ANUP"). When ANUP 320A realizes that the AN and UPF addresses are the same or correlated, it intelligently skips the GTP encapsulation/decapsulation processing. The simplified signaling may have certain drawbacks, however:
The deployment model is distributed UPFs-SMF 153 needs to interact with many distributed UPFs (UPF1 and UPF2, combined into respective ANUPs 320).
Traditional (though distributed) UPF is still used, while some operators may want to have alternatives to avoid vendor lock in.
The unified router/switch-based architecture for wireline and wireless networks is not achieved.

Figure 11:
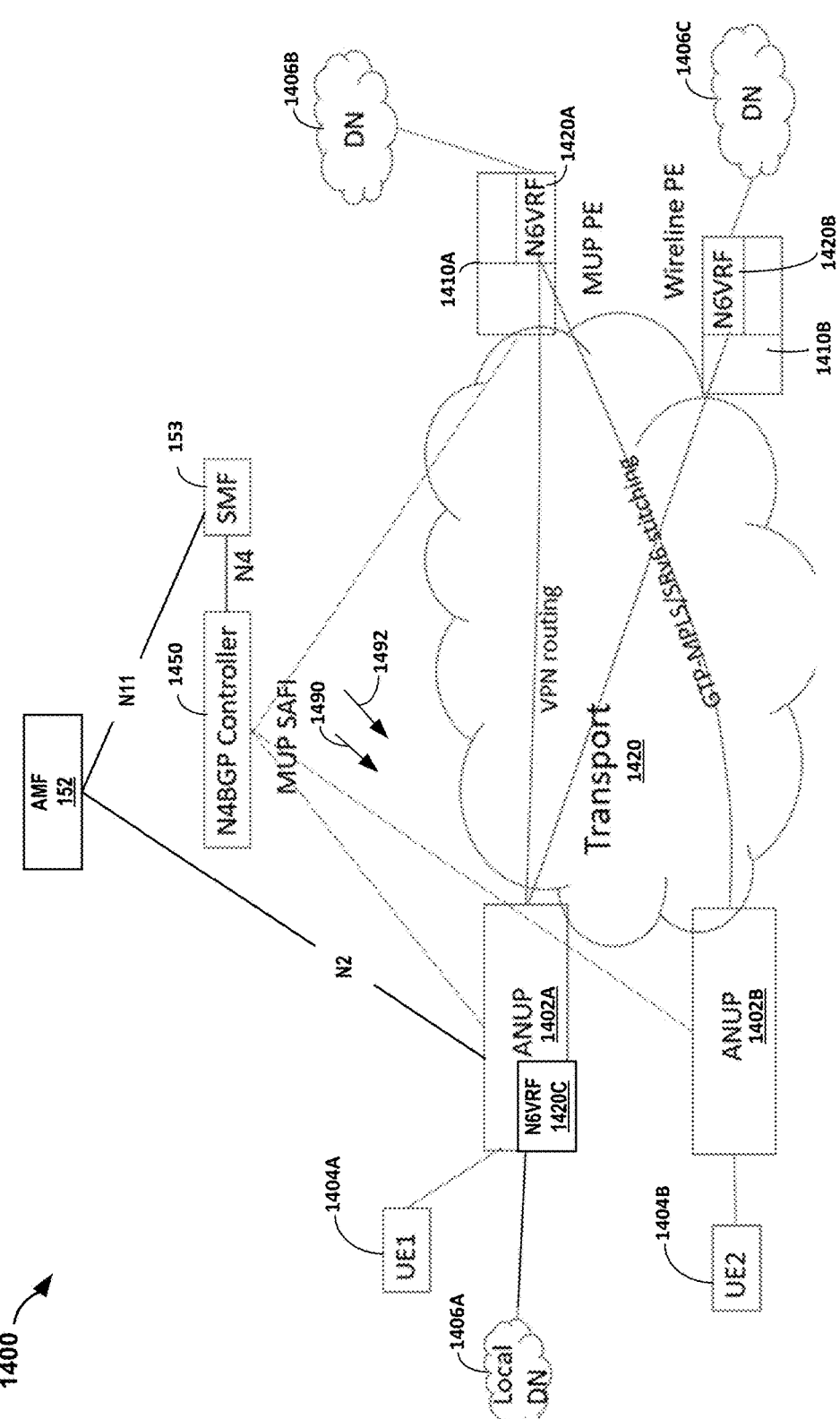
FIG. 11 is a block diagram depicting a network system implementing MUP, in which MUP Gateway BGP signaling is extended to the ANUPs, in accordance with techniques of this disclosure.

In accordance with techniques of this disclosure, these drawbacks may be addressed and overcome by extending Mobile User Plane (MUP) gateway (GW) BGP signaling to the ANUP, as shown in FIG. 11.

Figure 10:
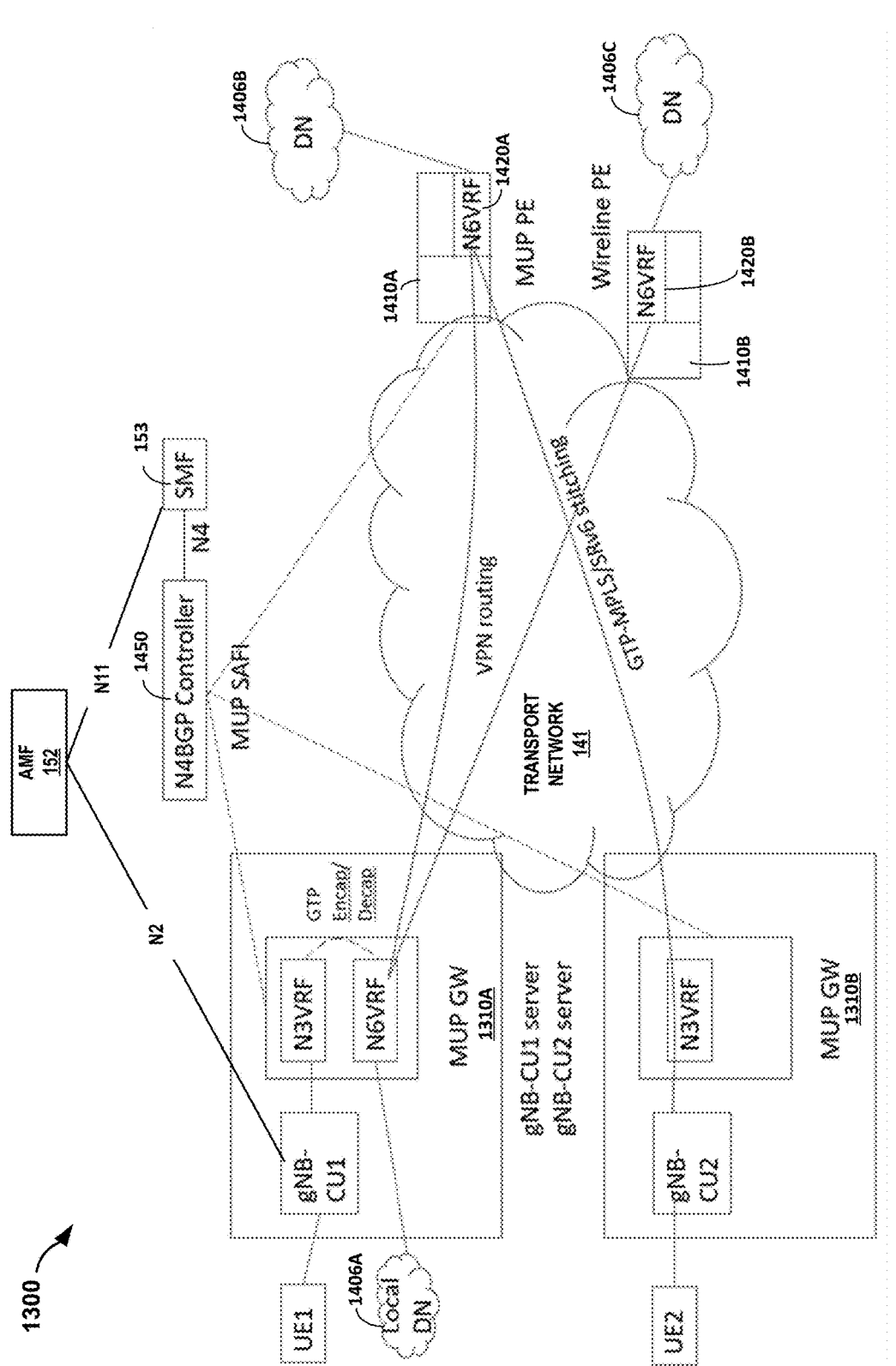
FIG. 10 is a block diagram depicting a mobile network system implementing a Mobile User Plane architecture.

FIG. 10 is a block diagram of a system implementing a Mobile User Plane architecture. The system may implement a mobile network, such as a 5G mobile network. In the example network system that is Mobile User Plane (MUP) system 1300, a central UPF is replaced with a collection of N4BGP Controller 1450, MUP Gateways 1310A-1310B (collectively, "MUP Gateways 1310"), and MUP PEs 1410A-1410B (collectively, "MUP PEs 1410"). MUP PEs 1410 and MUP Gateways 1310 connect over transport network 141. This replacement is done "under the hood" and requires no 3GPP architecture/signaling changes.
From the point of view of SMF 153 and gNodeB-CUs, these functions are signaling and communicating with a central UPF on the N4 and N3 interfaces, respectively.
The N4BGP Controller 1450 (also knows as MUP controller) implements N4 signaling with the SMF and translates session state for PDU sessions to BGP signaling towards MUP Gateways 1310 and MUP PEs 1410.
A MUP Gateway is a PE device that instantiates IP-VPN for the N3 tunneling in a central UPF deployment. As shown, there are multiple MUP Gateways 1310 in proximity to the gNodeBs-CUs. A MUP Gateway/gNodeB-CU pair can be co-located in the same server. Based on the BGP signaling (translated from N4), MUP Gateways 1310 install forwarding state to decapsulate UL GTP-U traffic and routes the decapsulated UE UL traffic for a PDU session either to a local DN (naively—as shown with a local data network (DN) 1406A connected to N6VRF of MUP Gateway 1310A) or to remote DN sites 1406B-1406C (collectively, "DN sites 1406") via an IP-VPN for the DN sites 1406. DL traffic for a PDU session arrives at the MUP Gateways 1310 and, based on different BGP signaling (but also translated from N4), the MUP Gateways 1310 encapsulate the DL traffic into GTP-U and send to the gNodeB-CUs.

In MUP, mobility is handled by the UE host routes maintained on the MUP PEs 1410 (signaled by BGP from the N4BGP Controller based on N4 signaling). When a UE moves from one gNodeB-CU to another that is connected to a different one of MUP Gateways 1310, the MUP PEs 1410 therefore know to which of MUP Gateways 1310 to send DL traffic. For Xn handover, nothing changes (GTP-U tunneling is still used).

In contrast to FIG. 9, in FIG. 10 the MUP Gateways 1310 are the N3VPN PEs connected to the access network. Put another way, distributed UPFs are implemented more similarly to a PE router that uses BGP signaling instead of a UPF that uses N4 signaling (with SMF 153). An N3VPN (implemented with N3VRFs of the MUP Gateways 1310) provides IP transport for the N3 tunnel. An N6VPN (implemented with N6VRFs of the MUP Gateways 1310) connects distributed DN sites 1406. With the MUP Gateways 1310, UL traffic in the N3/GTP tunnel is decapsulated in the N3VRF and directed to the N6VRF for routing to local or remote VPN sites attached to MUP PEs 1410. DL traffic arrives at N6VRFs of MUP Gateways 1310 via normal VPN routing, then is routed to a local DN or to UEs (with GTP encapsulation). In this way, GTP can be partially replaced by SRv6/MPLS tunneling or an IP-VPN. However, GTP on the N3 interface still occurs in system 1300 for all PDU sessions, between the gNodeB (or other access node) and the N6VRF, which are implementing the N3 interface.

A VRF is a virtual routing and forwarding instance typically used to implement BGP IP-VPNs. A VRF is an example of a routing instance.

System 1300 is Segment Routing agnostic. SRv6 is incidental—the key is that GTP handling is done on the MUP Gateways 1310. The concept works for MPLS and SR-MPLS as well.

FIG. 11 depicts a system 1400 implementing MUP, in which MUP GW BGP signaling is extended to the ANUPs, in accordance with techniques of this disclosure. Mobile network system 1400 may be based on 5G mobile network system specifications but the techniques of this disclosure are not limited to 5G and can be implemented in any future generation (xG) of mobile network systems.

BGP signaling designed for MUP Gateways can be extended to ANUP. Such BGP signaling replaces the N4 session signaling from SMF 153 (for both the MUP GW architecture and the ANUP).

UEs 1404A-1404B (collectively, "UEs 1404") connect to a mobile network to access services provided by data networks 1406A-1406C (collectively, "DNs 1406"). Such services may be packet-based and can include any service provided by a mobile network operator network, service provider network, cloud service provider network, the Internet, content delivery network, and so forth. Accordingly, any of DNs 1406 may represent any of the above types of data networks, or other type of data network.

For a 5G mobile network system, to connect with any of DNs 1406 to access services, UE 1404A (for example) sends a non-access stratum (NAS) message—the PDU Session Establishment message—to AMF 152. AMF 152 selects an SMF (e.g., SMF 153) and sends to SMF 153 a Create Session Management Context Request message. Based on at least the user subscription data associated with a user of UE 1404A, SMF 153 creates session management context and sends a session management context identifier to AMF 152 using a Create Session Management Context Response message.

SMF 153 allocates the UE IP address or MAC address for the PDU session being created and ordinarily selects a UPF to serve the PDU session and UE for connecting to DNs 1406. System 1400, however, replaces the UPF with N4BGP Controller 1450, which is therefore selected by SMF 153 as if it were a UPF. N4BGP Controller 1450 (rather than a UPF) implements the N4 interface with SMF 153 and accordingly performs at least some of the UPF functionality. For example, N4BGP Controller 1450 determines uplink (UL) tunnel information for what would ordinarily be a tunnel endpoint at the selected UPF. Here, the tunnel information includes an UL TEID for the PDU session and an IP address for the one of MUP PEs 1410A-1410B (collectively, "MUP PEs 1410"—MUP PE 1410B is a wireline PE) that provides reachability to the desired one of DNs 1406B, 1406C. N4BGP Controller 1450 provides the UL tunnel information to SMF 153. SMF 153 communicates the UL tunnel information to AMF 152, which provides the UL tunnel information to ANUP 1402A (serving UE 1404A) via the N2 interface. The UL tunnel information is considered N3 tunnel information.

Because ANUP 1402A integrates the access network function (e.g., CU), the UL tunnel information could be, but is not, used by ANUP 1402A to send GTP-encapsulated UL PDU traffic to MUP PE 1410 via an N3/GTP tunnel. The use of UL tunnel information by ANUP 1402A to implement techniques of this disclosure is described below. SMF 153 may provide additional information to ANUP 1402A for the PDU session, such as QoS parameters.

ANUP 1402A and UE 1404A create a data radio bearer (DRB) using the access network protocol layers. ANUP 1402A sends the PDU Session Establishment Accept, which includes the UE IP address and has been relayed by AMF 152, to UE 1404A via the N1 interface. UE 1404A can now sent UL PDU traffic to ANUP 1402A on the DRB.

To enable downlink (DL) PDU traffic for the UE 1404A PDU session being requested, ANUP 1402A determines DL tunnel information for what would ordinarily be a tunnel endpoint at ANUP 1402A. The DL tunnel information may include a DL TEID. ANUP 1402A sends the DL tunnel information to AMF 153, which relays the DL tunnel information to SMF 153. SMF 153 provide the DL tunnel information to N4BGP Controller 1450 (impersonating the selected UPF), e.g., using a Session Modification message on the N4 interface. N4BGP Controller 1450 stores the DL tunnel information for the PDU session for UE 1404A.

BGP Signaling for the MUP Gateway Architecture

Returning to FIG. 10 and MUP system 1300 depicting a convention MUP Gateway architecture, PDU Session information that is signaled from SMF 153 via N4 interface is translated by N4BGP Controller 1450 to two route types for advertisement using routing protocol messages in accordance with a routing protocol (these route types may be of a new BGP SAFI). Example details for the two route types is described in "BGP Extensions for the Mobile User Plane (MUP) SAFI," draft-mpmz-bess-mup-safi-00, Internet Engineering Task Force, 7 Mar. 2022, incorporated by reference above. The two route types are:

Session Translated Route Type 1 (ST1)

a. The ST1 NLRI encodes <UE prefix, AN address, AN TEID> i. Maps the UE to an Access Network node address (AN address) and AN TEID for DL traffic.

b. ST1 is imported by MUP Gateways 1310 into N6VRF due to N6VPN Route Target i. UE prefix routes point to next hops that perform GTP encapsulation based on the AN address and AN TEID (alternatively referred to herein as the "DL TEID"). The AN address may be an IP address for one of ANUPs 1402 in system 1400.

c. ST1 is imported by MUP PEs 1410 into N6VRF i. UE prefix routes point to next hops to do one of the following (in the DL direction—right to left in FIG. 10):

1. Direct traffic to an N6VRF on a MUP Gateway for routing to UEs (e.g., to N6VRF on MUP Gateway 1310A)

2. Direct traffic to a MUP Gateway that performs GTP encapsulation without routing in N6VRF (e.g., directly to N3VRF of MUP Gateway 1310B using GTP-MPLS/SRv6 stitching).

a. Using SRv6 SID and SRH with <AN address, AN TEID> encoded, or b. Using an MPLS label stack with a GTP header (without IP/UDP header)

N4BGP Controller 1450 is a BGP speaker and generates ST1 routes from corresponding session information received from SMF 153 via the N4 interface. Such session information for generating ST1 routes include DL tunnel information provided by the access network, such as by one of ANUPs 1402 of FIG. 11 or gNodeB-CUs of FIG. 10. When advertising an ST1 route, N4BGP Controller 1450 may include a Route Target (RT) extended community which the MUP PEs 1410 are importing into the routing instance for the corresponding one of DNs 1406. For example, the RT extended community should be set in an ST1 route for a PDU session to connect UE 1404A to DN 1406B to cause MUP PE 1410A to import the ST1 route into N6VRF 1420A to which DN 1406B is attached. N4BGP Controller 1450 sets the nexthop of an STI route to the IP address of N4BGP Controller 1450.

Extended Communities are a type of BGP attribute and are described in RFC 4360, "BGP Extended Communities Attribute," February 2006.

Session Translated Route Type 2 (ST2)

a. A ST2 route NLRI encodes <UPF address, UPF TEID>. The UPF TEID is alternatively referred to herein as "UL TEID".

b. A MUP Gateway installs forwarding state in N3VRF to perform GTP decapsulation and direct traffic to the appropriate one of the N6VRFs in MUP Gateway 1310A (for local the DN) or MUP PEs 1410 (for DNs 1406).

i. The appropriate N6VRF is identified based on an Extended Community included in an ST2 route advertisement, derived from (and which maps to) the Route Target for the N6VPN. The Extended Community may also be the BGP MUP Extended community, which can be used to resolve/identify the appropriate N6VRF.

N4BGP Controller 1450 generates ST2 routes from corresponding session information received from SMF 153 via the N4 interface. Such session information for generating ST2 routes include UL tunnel information provided by N4BGP Controller 1450. UL tunnel information can include the UL TEID for the PDU session.

When advertising an ST2 route, N4BGP Controller 1450 includes a Route Target (RT) extended community of the routing instances in the MUP GWs 1310 accommodating the corresponding Internetwork Segment. For example, the RT extended community should be set in an ST2 route for a PDU session to connect UE 1404A to DN 1406B to cause MUP GW 1310A to import the ST2 route into its N3VRF routing instance serving UE1. N4BGP Controller 1450 sets the nexthop of an ST1 route to the IP address of N4BGP Controller 1450.

The ST1 and ST2 routes are both types of session translated routes. Advertisements for ST1 and ST2 routes may include Mobile User Plane (MUP) Subsequent Address Family Indicator (SAFI) to identify them as session translated routes.

Returning to FIG. 11, in accordance with techniques described in this disclosure, system 1400 extends Mobile User Plane-Gateway architecture BGP signaling to ANUPs 1402. For example, ANUPs 1402 implement the N2 interface with AMF 152. ANUPs 1402 are extended to receive session translated routes. The session translated routes are the ST1 and ST2 routes described above, and are translated from session information by a N4BGP controller 1450 communicating with the SMF 153 on the N4 interface (as described above, with respect to system 1300 of FIG. 10).

ANUPs 1402 described herein correlate N2- (from AMF 152/SMF 153) and BGP- (from the N4BGP controller 1450) signaled information to eliminate, at least for some sessions, GTP encapsulation and decapsulation. For example, ANUP 1402A may map tunnel information included in a first type of the session translated routes (e.g., ST1 routes) to a PDU session/DRB for downlink traffic (toward one of UEs 1404). For uplink traffic, ANUP 1402A may map tunnel information and a routing instance identifier included in a second type of the session translated routes (e.g., ST2 routes) to a routing instance, such as any of N6VRFs 1420, advertising reachability to any of DNs 1406. This routing instance may be located on a remote PEs 1410 or on ANUP 1402A, for example. ANUP 1402A can then directly map a PDU session for the uplink traffic to the routing instance in the forwarding information.

BGP Signaling for 5G ANUP a. The ST1/ST2 routes are received by ANUP 1402A instead of by MUP GWs (as described above in "BGP signaling for the MUP Gateway Architecture").

b. The DL TEID in ST1 routes is originally assigned by ANUP 1402A for a PDU session.

i. Matching on the received DL TEID in an ST1 route against the ANUP 1402A assignment record causes the UE prefix routes in N6VRF 1420C to have a next hop corresponding to the PDU session for DL traffic.

c. The UL TEID in ST2 routes is assigned by N4BGP controller 1450 on behalf of UPF for a PDU session, and it is also signaled to ANUPs 1402 (from AMF 152 via the N2 interface) for mapping to DRBs created by the ANUPs 1402.

i. Matching on an UL TEID signaled via N2 interface and received in an ST2 route allows an ANUP 1402 to direct UL PDU traffic to the corresponding N6VRF (identified by the Extended Community derived from the N6VPN).

d. No GTP encapsulation/decapsulation is used/needed.

Figure 14:
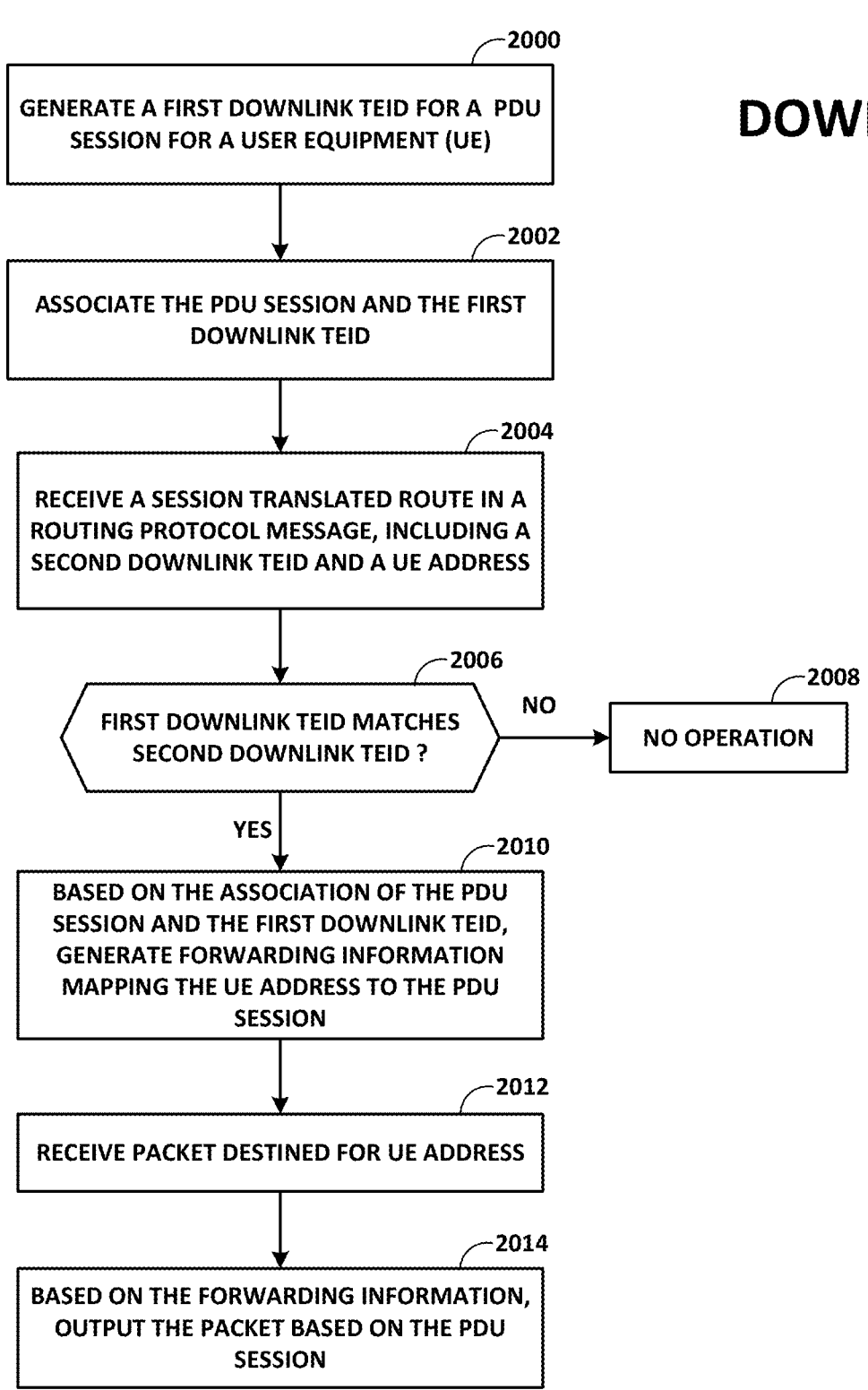
FIG. 14 is a flowchart depicting an example mode of operation for an ANUP to determine forwarding for downlink traffic for a PDU session.

Expanding on the above outline, FIG. 14 is a flowchart depicting an example mode of operation for ANUP 1402A to determine forwarding for downlink traffic for a PDU session between UE 1404A and MUP PE 1410A. As part of the PDU session establishment process, ANUP 1402A as an access network node generates a first DL TEID for the PDU session and outputs the first DL TEID to a mobile network control plane function (e.g., AMF 152) (2000). ANUP 1402A associates the PDU session with the first DL TEID (2002). For example, ANUP 1402A may create a DRB with UE 1404A for the PDU session and associates the DRB with the first DL TEID in the record. In 5G access nodes, such an association is conventionally used for relaying PDU traffic between the access network protocol layers and the GTP layer.

ANUP 1402A subsequently receives a routing protocol message, ST1 route 1490, that includes a second DL TEID (also referred to as "AN TEID") and second AN address for establishing a PDU session as well as an IP address for UE 1404A ("UE address") (ANUP 1402A) (2004). ST1 route 1490 is generated by N4BGP controller 1450 from session information provided by SMF 153 on the N4 interface. ANUP 1402A correlates DL tunnel information for its PDU sessions with DL tunnel information included in ST1 routes. For example, for the second DL TEID included in ST1 route 1490, ANUP 1402A determines whether ANUP 1402A is implementing a PDU session that is associated with a DL TEID matching the second DL TEID (2006). In some cases, ANUP 1402A determines whether ANUP 1402A is implementing a PDU session that is associated with a DL TEID and a AN address match the second DL TEID and second AN address, respectively. If not (NO branch of 2006), ANUP 1402A may take no action (2008).

When the second DL TEID matches the first DL TEID generated at step (2000) (YES branch of 2006), ANUP 1402A uses the association of the first DL TEID and the PDU session to map the UE address included in ST1 route 1490 to the PDU session, and ANUP 1402A generates forwarding information to cause ANUP 1402A to output packets destined for the UE address based on the PDU session (2010). Again, the second DL TEID and the first DL TEID match in this branch of the example operation of FIG. 14, where matching TEIDs may be equivalent or otherwise indicative of representing the same tunnel endpoint on ANUP 1402A.

ANUP 1402A subsequently receives a packet on transport network 1420 that is destined for the UE address (2012). Based on the forwarding information, ANUP 1402A outputs the packet via the PDU session to UE 1404A (2014). No GTP tunneling is performed. As an example of outputting the packet based on the PDU session to UE 1404A, ANUP 1402A may output the packet via a DRB with UE 1404A for the PDU session.

Further expanding on the above outline, FIG. 15 is a flowchart depicting an example mode of operation for ANUP 1402A to determine forwarding for uplink traffic for a PDU session between UE 1404A and MUP PE 1410A. ANUP 1402A, as a router, has a routing instance N6VRF 1420C configured with a route target to import routes exported from N6VRF 1420A. ANUP 1402A (N6VRF 1420C) may import a route to a DN 1406B prefix, where the route is advertised by MUP PE 1410A as exported from N6VRF 1420A to which DN 1406B is attached.

As part of the PDU session establishment process, ANUP 1402A as an access network node (e.g., implementing a gNodeB) receives PDU session information for a PDU session, on an interface (e.g., N2) with a mobile network control plane function (e.g., AMF 152) (3002). The PDU session information includes a first UL TEID (also known as a UPF TEID) and a first UPF address, which together define a particular tunnel endpoint for the PDU session. A UPF address is an example of a tunnel endpoint address. An access network node address (AN address) is another example of tunnel endpoint address. ANUP 1402A may establish a DRB with UE 1404A for uplink traffic and associate the DRB with the DPU session in a record. In 5G access nodes, such a record is conventionally used for relaying PDU traffic between the access network protocol layers and the GTP layer.

ANUP 1402A subsequently receives a routing protocol message, ST2 route 1492, in accordance with a routing protocol. ST2 route 1492 includes a second UL TEID, a second UPF address, and an identifier that indicates routing instance 1420C (3004). ST1 route 1492 is generated by N4BGP controller 1450 from session information provided by SMF 153 on the N4 interface. N4BGP controller 1450 may allocate the second UL TEID for the UPF address, and N4BGP controller 1450 sets the UPF address based on the session information. Here, the UPF address in IP address of ANUP 1402A. ANUP 1402A correlates UL tunnel information for its PDU sessions with UL tunnel information included in ST1 routes. For example, for the second UL TEID and second UPF address included in ST2 route 1492, ANUP 1402A determines whether it implements a PDU session associated with a UL TEID/UPF address pair that matches the second UL TEID and second UPF address (3006). If not (NO branch of 3006), ANUP 1402A may take no action (3008). In some examples, ANUP 1402A may simply match the second UL TEID to the first UL TEID, since the UPF addresses may both be ANUP 1402A.

When the second UL TEID and second UPF address included in ST2 route 1492 matches the first UL TEID and first UPF address received via the N2 interface (YES branch of 3006), ANUP 1402A generates forwarding information that maps the PDU session with the first UL TEID and first UPF address to the routing instance 1420C indicated in ST2 route 1492 (3012). To generate the forwarding information, ANUP 1402a may map a DRB for the PDU session to the routing instance 1420C.

ANUP 1402A receives a packet associated with the PDU session (e.g., on a PDU session DRB) from UE 1404A (3014). Based on the forwarding information, ANUP 1402A forwards the packet, received from UE 1404A via the PDU session, using routing instance N6VRF 1420C. (3016). No GTP tunneling is performed. If routing instance N6VRF 1420C has imported a route exported from N6VRF 1420A having a destination prefix that matches the packet destination, ANUP 1402A forwards the packet too PE 1410A implementing N6VRF 1420A. However, the destination may be in any of DNs 1406, including local DN 1406A, in which case ANUP 1402A forwards the packet to local DN 1406 based on imported or configured routes for N6VRF 1420C.

In system 1300 of FIG. 10, MUP Gateway 1310A terminates GTP encapsulation, but GTP tunneling still occurs on the N3 interface implemented between the N3VRF and N6VRFs. In system 1400 of FIG. 11 by contrast, by extending BGP signaling to ANUPs 1402, GTP-U encapsulation/decapsulation can be skipped based on correlated N2 and BGP signaling. Thus, BGP signaling designed for MUP Gateways is extended to 5G ANUP.

The techniques described above with respect to system 1400 may provide one or more technical advantages that realize one or more practical applications. For example, by extending BGP signaling with MUP SAFI to ANUP 1402A, the techniques effectively extend BGP signaling to the access network nodes for the radio access network of the mobile network. The techniques can therefore eliminate GTP tunneling, and thus GTP encapsulation/decapsulation, for UE traffic being transported between DNs 1406 and UEs 1404. Reducing GTP encapsulation/decapsulation reduces compute resource consumption, decreases packet processing latency, and facilitate reduced packet overhead. In addition, because the techniques involve the ANUP 1402A processing ST1 and ST2 routes generated by N4BGP controller 1450 signaling with the SMF 153 on the N4 interface, there is no modification needed or difference in the deployment mode for SMF 153 and access network node implemented in ANUP 1402A. That is, from the point of view of SMF 153, it is communicating with a UPF on the control plane/N4 interface. From the point of view of ANUP 1402A implementing an access network node (e.g., gNodeB-CU), it is communicating with a UPF on the data plane/N3 interface (though without GTP). The techniques also reduce a possibility of vendor lock-in on the UPF implementation by leveraging BGP and VPNs for transport using the MUP SAFI. The UPF(s) data forwarding function is, in effect, replaced by a VPN connecting DNs 1406 to the access network served by ANUP 1402A, and session routing information is injected into this VPN by N4BGP controller 1450, while ANUP 1402A maps VPN routing information to PDU sessions in the downlink and uplink directions.

FIG. 12 is a block diagram illustrating mappings of session translated route information and PDU sessions for an ANUP, in accordance with techniques of this disclosure. Table 1602 depicts fields of an ST1 route (UE prefix, access network address, access network TEID [DL TEID]). Based on correlated tunnel information of N2 and BGP signaling, the UE prefix is mapped to a PDU session (DL DRB) in forwarding information such that the ANUP outputs traffic destined for a UE prefix (e.g., a /32 address) via the PDU session.

Table 1604 depicts fields of an ST2 route (UPF address, UPF TEID [UL TEID]). The ST2 route also includes an identifier indicating a routing instance (N6VRF column). Based on correlated tunneling information of N2 and BGP signaling, the PDU session associated with the UL TEID (and optionally the UPF address) in the ST2 route is mapped to the routing instance in forwarding information such that the ANUP outputs traffic received via the PDU session based on the routing instance.

To output traffic based on a routing instance, routing information configured in or imported into the routing instance is used to generate forwarding information. The device implementing the routing instance forwards packets using forwarding information generated from the routes of the routing instance.

Figure 13:
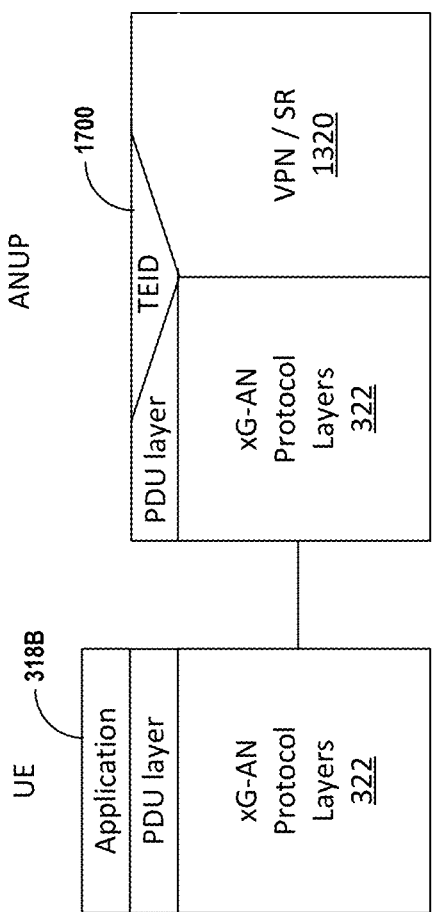
FIG. 13 is a conceptual diagram depicting the user of correlated TEIDs to associate PDU sessions with VPN/SR tunnels, in accordance with techniques of this disclosure.

FIG. 13 is a conceptual diagram depicting the user of correlated TEIDs to associate PDU sessions with VPN/SR tunnels, in accordance with techniques of this disclosure. The VPN tunnels may be for the N6VPN described above.

Although BGP signaling in a MUP Gateway does not handle Lawful Intercept (LI), in some examples of the described techniques, BGP Flow spec can be used for LI. Based on N4 signaling, BGP Flow Spec routes will be advertised to MUP Gateways 1310 in the system 1300 and/or ANUPs 1402 in system 1400 to mirror matched traffic for LI purposes. LI support typically requires a central LI controller entity to inform base stations that a certain UE's user plane data should be intercepted/replicated lawfully/legally and the UPFs should duplicate those packets to LI listeners. To support LI as part of the techniques disclosed herein, locally terminated packets may be replicated to a central LI listener, which means directing a particular one or group of ANUPs and/or MUP Gateways 1310 to perform this action. This trigger can be implemented via an xApp or rApp of a RAN Intelligent Controller (near-RT or non-RT), where the xApp/rApp subscribes to a central LI server for the list of targeted UEs, the xApp/rApp dynamically tracks in which base station(s) those UEs are located and as there are new attachments/deattachments or handovers, and the xApp/rApp informs the involved base stations (which may include any of ANUPs 1402).

In an example, a method comprises receiving, at device implementing an integrated Access Network-User Plane (ANUP) function or a Mobile User Plane Gateway, a BGP Flow Spec route indicating user plane data for a User Equipment; based on the BGP Flow Spec route, replicating the user plane data for the User Equipment to a Lawful Intercept listener.

In another example, the BGP Flow Spec route is transformed from N4 signaling received from a mobile network control plane function. In another example, the BGP Flow Spec route is output by a N4BGP controller implementing the N4 interface.

In another example, the method further comprises receiving, at device implementing an integrated Access Network-User Plane (ANUP) function, from a radio access network intelligent controller (RIC) via an interface, an indication to perform lawful intercept for user plane data for a User Equipment; based on the indication, replacing the user plane data for a User Equipment to a Lawful Intercept listener.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A computing system comprising:

one or more storage devices; and processing circuitry having access to the one or more storage devices, the processing circuitry configured to:

receive a routing protocol message comprising second tunnel information for a packet data unit (PDU) session for a User Equipment (UE) and comprising data indicating a routing instance or a UE address for the UE, wherein the routing protocol message conforms to a Border Gateway Protocol;

based at least in part on matching the second tunnel information with first tunnel information sent or received on an N2 interface with a mobile network control plane function comprising an Access & Mobility Management Function (AMF), generate forwarding information to map the UE address to the PDU session or to map the PDU session to the routing instance; and based at least in part on the forwarding information, output a packet associated with the PDU session.

2. The computing system of claim 1, wherein the second tunnel information comprises a second General Packet Radio Service (GPRS) Tunneling Protocol (GTP) tunnel endpoint identifier (TEID) and a second tunnel endpoint address, and wherein the first tunnel information comprises a first TEID and a first tunnel endpoint address.

3. The computing system of claim 1, wherein the routing protocol message comprises a session translated route generated based on PDU session information signaled by the mobile network control plane function.

4. The computing system of claim 1, wherein the processing circuitry is configured to exchange the packet with the UE via a data radio bearer established between the computing system and the UE for the PDU session.

5. The computing system of claim 1, wherein the processing circuitry is configured to generate the forwarding information to map the PDU session to the routing instance, and wherein to generate the forwarding information to map the PDU session to the routing instance, the processing circuitry is configured to generate the forwarding information to cause the computing system to forward the packet based on routing information of the routing instance.

6. The computing system of claim 1, wherein the processing circuitry is configured to implement an integrated Access Network-User Plane (ANUP) function.

7. A computing system comprising:

one or more storage devices; and processing circuitry having access to the one or more storage devices, the processing circuitry configured to:

receive a routing protocol message comprising second tunnel information for a packet data unit (PDU) session for a User Equipment (UE) and comprising data indicating a routing instance or a UE address for the UE, wherein the routing protocol message comprises a first type of session translated route generated based on PDU session information signaled by the mobile network control plane function, wherein the second tunnel information comprises a second downlink General Packet Radio Service (GPRS) Tunneling Protocol (GTP) tunnel endpoint identifier (second DL TEID) and a second tunnel endpoint address;

based at least in part on matching the second tunnel information with first tunnel information sent or received on an interface with a mobile network control plane function, generate forwarding information to map the UE address to the PDU session or to map the PDU session to the routing instance, wherein to match the second tunnel information with the first tunnel information, the processing circuitry is configured to determine whether a first DL TEID and first tunnel endpoint address associated with the PDU session match the second DL TEID and second tunnel endpoint address, respectively; and based at least in part on the forwarding information, output a packet associated with the PDU session.

8. The computing system of claim 7, wherein the processing circuitry is configured to:

generate the first tunnel information comprising the first DL TEID and the first tunnel endpoint address associated with the PDU session; and send, to the mobile network control plane function via the interface, the first DL TEID and the first tunnel endpoint address.

9. The computing system of claim 7, wherein the processing circuitry is configured to generate the forwarding information to map the UE address to the PDU session, and wherein to generate forwarding information to map the UE address to the PDU session, the processing circuitry is configured to:

generate the forwarding information to cause the computing system to output packets, destined to the UE address, via a data radio bearer (DRB) with the UE associated with the PDU session.

10. A computing system comprising:

one or more storage devices; and processing circuitry having access to the one or more storage devices, the processing circuitry configured to:

receive a routing protocol message comprising second tunnel information for a packet data unit (PDU) session for a User Equipment (UE) and comprising data indicating a routing instance or a UE address for the UE, wherein the routing protocol message comprises a second type of session translated route generated based on PDU session information signaled to the mobile network control plane function, wherein the second tunnel information comprises a second uplink General Packet Radio Service (GPRS) Tunneling Protocol (GTP) tunnel endpoint identifier (second UL TEID) and a second tunnel endpoint address;

based at least in part on matching the second tunnel information with first tunnel information sent or received on an interface with a mobile network control plane function, generate forwarding information to map the UE address to the PDU session or to map the PDU session to the routing instance, wherein to match the second tunnel information with first tunnel information, the processing circuitry is configured to determine whether a first UL TEID and a first tunnel endpoint address associated with the PDU session matches the second UL TEID and the second tunnel endpoint address, respectively; and based at least in part on the forwarding information, output a packet associated with the PDU session.

11. The computing system of claim 10, wherein the second tunnel endpoint address comprises a User Plane Function (UPF) address for an integrated Access Network-User Plane (ANUP) function implemented by the computing system.

12. The computing system of claim 10, wherein the processing circuitry is configured to:

receive, from the mobile network control plane function via the interface, the first UL TEID) and first tunnel endpoint address associated with the PDU session, wherein the processing circuitry is configured to generate the forwarding information to map the PDU session to the routing instance, and wherein to generate the forwarding information to map the PDU session to the routing instance, the processing circuitry is configured to generate the forwarding information to cause the computing system to output packets, received via a data radio bearer (DRB) with the UE associated with the PDU session, based on the routing instance.

13. The computing system of claim 1, wherein the routing instance comprises a virtual routing and forwarding instance (VRF).

14. A method comprising:

receiving, by a computing system, a routing protocol message comprising second tunnel information for a packet data unit (PDU) session for a User Equipment (UE) and comprising data indicating a routing instance or a UE address for the UE, wherein the routing protocol message conforms to a Border Gateway Protocol;

by the computing system, based on matching the second tunnel information with first tunnel information sent or received on an N2 interface with a mobile network control plane function comprising an Access & Mobility Management Function (AMF), generating forwarding information to map the UE address to the PDU session or to map the PDU session to the routing instance; and based on the forwarding information, outputting, by the computing system, a packet associated with the PDU session.

15. The method of claim 14, wherein the second tunnel information comprises a second General Packet Radio Service (GPRS) Tunneling Protocol (GTP) tunnel endpoint identifier (TEID) and a second tunnel endpoint address, and wherein the first tunnel information comprises a first TEID and a first tunnel endpoint address.

16. The method of claim 14, wherein the routing protocol message comprises a session translated route generated based at least in part on PDU session information signaled by the mobile network control plane function.

17. The method of claim 14, wherein the routing protocol message comprises a first type of session translated route generated based on PDU session information signaled by the mobile network control plane function, wherein the second tunnel information comprises a second downlink General Packet Radio Service (GPRS) Tunneling Protocol (GTP) tunnel endpoint identifier (second DL TEID) and a second tunnel endpoint address, and wherein matching the second tunnel information with first tunnel information comprises determining whether a first DL TEID and first tunnel endpoint address associated with the PDU session match the second DL TEID and second tunnel endpoint address, respectively.

18. The method of claim 14, wherein the routing protocol message comprises a second type of session translated route generated based on PDU session information signaled to the mobile network control plane function, wherein the second tunnel information comprises a second uplink General Packet Radio Service (GPRS) Tunneling Protocol (GTP) tunnel endpoint identifier (second UL TEID) and a second tunnel endpoint address, and wherein matching the second tunnel information with first tunnel information comprises determining whether a first UL TEID and a first tunnel endpoint address associated with the PDU session matches the second UL TEID and the second tunnel endpoint address, respectively.

19. One or more computer-readable storage devices, comprising instructions for causing processing circuitry to:

receive a routing protocol message comprising second tunnel information for a packet data unit (PDU) session for a User Equipment (UE) and comprising data indicating a routing instance or a UE address for the UE, wherein the routing protocol message conforms to a Border Gateway Protocol;

based at least in part on matching the second tunnel information with first tunnel information sent or received on an N2 interface with a mobile network control plane function comprising an Access & Mobility Management Function (AMP), generate forwarding information to map the UE address to the PDU session or to map the PDU session to the routing instance; and based at least in part on the forwarding information, output a packet associated with the PDU session.

\* \* \* \* \*